(12) United States Patent
Nixon

(10) Patent No.: US 10,358,235 B2
(45) Date of Patent: \*Jul. 23, 2019

(54) METHOD AND SYSTEM FOR CREATING A PHOTOMAP USING A DUAL-RESOLUTION CAMERA SYSTEM

(71) Applicant: nearmap australia pty ltd, Sydney NSW (AU)

(72) Inventor: Stuart William Nixon, Perth (AU)

(73) Assignee: nearmap australia pty ltd, Sydney NSW (AU)

(\*) Notice: Subject to any disclaimer, the term of this patent is extended or adjusted under 35 U.S.C. 154(b) by 494 days.

This patent is subject to a terminal disclaimer.

(21) Appl. No.: 13/873,857

(22) Filed: Apr. 30, 2013

(65) Prior Publication Data
US 2013/0235199 A1    Sep. 12, 2013

Related U.S. Application Data

(63) Continuation of application No. 12/565,232, filed on Sep. 23, 2009, now Pat. No. 8,497,905, which is a continuation-in-part of application No. 12/101,167, filed on Apr. 11, 2008, now Pat. No. 8,675,068.

(51) Int. Cl.
*B64D 47/08* (2006.01)
*G01C 11/06* (2006.01)
*B64G 1/10* (2006.01)
*H04N 5/341* (2011.01)

(52) U.S. Cl.
CPC .......... *B64D 47/08* (2013.01); *B64G 1/1021* (2013.01); *B64G 1/1085* (2013.01); *G01C 11/06* (2013.01); *H04N 5/3415* (2013.01); *B64G 2001/1028* (2013.01)

(58) Field of Classification Search
None
See application file for complete search history.

(56) References Cited

U.S. PATENT DOCUMENTS

| | | | |
|---|---|---|---|
| 1,654,070 A | 12/1927 | Corlette et al. |
| 2,989,890 A | 6/1961 | Dressler |
| 4,662,588 A | 5/1987 | Henderson |
| 4,671,650 A | 6/1987 | Hirzel et al. |
| 4,689,748 A | 8/1987 | Hoffman |

(Continued)

FOREIGN PATENT DOCUMENTS

| | | |
|---|---|---|
| EP | 1 418 402 B1 | 6/2006 |
| EP | 1 696 204 A1 | 8/2006 |

(Continued)

OTHER PUBLICATIONS

F. Heintz, P. Rudol, and P. Doherty, "From images to traffic behavior—a UAV tracking and monitoring application," 10th IEEE International Conference on Information Fusion, 2007.*

(Continued)

*Primary Examiner* — Edemio Navas, Jr.
(74) *Attorney, Agent, or Firm* — Oblon, McClelland, Maier & Neustadt, L.L.P.

(57) ABSTRACT

A method and system are presented in which images are captured from overview and detail imaging devices such that overview images are created with a first degree of redundancy, and detail images are captured with less overlap and a second degree of redundancy.

19 Claims, 15 Drawing Sheets

(56) References Cited

U.S. PATENT DOCUMENTS

| | | | |
|---|---|---|---|
| 4,802,757 A | 2/1989 | Pleitner et al. | |
| 4,876,651 A | 10/1989 | Dawson et al. | |
| 4,951,136 A | 8/1990 | Drescher | |
| 5,073,819 A | 12/1991 | Gates et al. | |
| 5,104,217 A | 4/1992 | Pleitner et al. | |
| 5,138,444 A | 8/1992 | Hiramatsu | |
| 5,247,356 A | 9/1993 | Ciampa | |
| 5,251,037 A | 10/1993 | Busenberg | |
| 5,259,037 A | 11/1993 | Plunk | |
| 5,345,086 A | 9/1994 | Bertram | |
| 5,555,018 A | 9/1996 | Von Braun | |
| 5,581,637 A | 12/1996 | Cass | |
| 5,596,494 A | 1/1997 | Kuo | |
| 5,604,534 A | 2/1997 | Hedges | |
| 5,625,409 A * | 4/1997 | Rosier et al. | 348/117 |
| 5,633,946 A | 5/1997 | Lachinski et al. | |
| 5,757,423 A | 5/1998 | Tanaka et al. | |
| 5,765,044 A | 6/1998 | Murai et al. | |
| 5,790,188 A | 8/1998 | Sun | |
| 5,798,923 A | 8/1998 | Laskowski | |
| 5,844,602 A | 12/1998 | Lareau | |
| 5,883,584 A | 3/1999 | Langemann et al. | |
| 5,894,323 A | 4/1999 | Kain | |
| 5,953,054 A | 9/1999 | Mercier | |
| 5,963,664 A | 10/1999 | Kumar et al. | |
| 5,991,444 A | 11/1999 | Burt | |
| 5,999,211 A | 12/1999 | Hedges | |
| 6,078,701 A | 6/2000 | Hsu | |
| 6,088,055 A | 7/2000 | Lareau | |
| 6,122,078 A | 9/2000 | Leberi et al. | |
| 6,134,297 A | 10/2000 | Chao | |
| 6,201,897 B1 | 3/2001 | Nixon | |
| 6,209,834 B1 | 4/2001 | Stonehouse | |
| 6,211,906 B1 | 4/2001 | Sun | |
| 6,255,981 B1 | 7/2001 | Samaniego | |
| 6,442,298 B1 | 8/2002 | Nixon | |
| 6,473,119 B1 | 10/2002 | Teuchert | |
| 6,490,364 B2 | 12/2002 | Hanna et al. | |
| 6,552,744 B2 | 4/2003 | Chen | |
| 6,587,601 B1 | 7/2003 | Hsu et al. | |
| 6,633,688 B1 | 10/2003 | Nixon | |
| 6,694,064 B1 | 2/2004 | Benkelman | |
| 6,757,445 B1 | 6/2004 | Knopp | |
| 6,834,163 B2 | 12/2004 | Trunz et al. | |
| 6,834,234 B2 | 12/2004 | Scherzinger et al. | |
| 6,928,194 B2 | 8/2005 | Mai | |
| 6,933,965 B2 | 8/2005 | Heafitz | |
| 6,996,254 B2 | 2/2006 | Zhang | |
| 7,009,638 B2 | 3/2006 | Gruber | |
| 7,019,777 B2 | 3/2006 | Sun | |
| 7,102,664 B2 | 9/2006 | Holdaway | |
| 7,127,348 B2 | 10/2006 | Smitherman | |
| 7,149,366 B1 | 12/2006 | Sun | |
| 7,212,938 B2 | 5/2007 | Mai | |
| 7,215,364 B2 | 5/2007 | Wachtel | |
| 7,233,691 B2 | 6/2007 | Setterholm | |
| 7,283,658 B2 | 10/2007 | Maruya | |
| 7,287,701 B2 | 10/2007 | Miller | |
| 7,307,655 B1 | 12/2007 | Okamoto et al. | |
| 7,310,606 B2 | 12/2007 | Nemethy et al. | |
| 7,339,614 B2 | 3/2008 | Gruber | |
| 7,424,133 B2 | 9/2008 | Schultz et al. | |
| 7,437,062 B2 | 10/2008 | Holcomb | |
| 7,509,241 B2 | 3/2009 | Guo et al. | |
| 7,630,579 B2 | 12/2009 | Mai et al. | |
| 7,639,897 B2 | 12/2009 | Gennetten et al. | |
| 7,668,402 B2 | 2/2010 | Grindstaff et al. | |
| 7,688,438 B2 | 3/2010 | Cutlip et al. | |
| 7,725,258 B2 | 5/2010 | Smitherman | |
| 7,873,238 B2 | 1/2011 | Schultz et al. | |
| 2001/0015755 A1 | 8/2001 | Mathews | |
| 2002/0063711 A1 | 5/2002 | Park et al. | |
| 2002/0085094 A1 | 7/2002 | Teuchert | |
| 2002/0149674 A1 | 10/2002 | Mathews | |
| 2002/0163582 A1 | 11/2002 | Gruber | |
| 2003/0048357 A1 | 3/2003 | Kain | |
| 2004/0041999 A1 | 3/2004 | Hogan et al. | |
| 2004/0100559 A1 | 5/2004 | Stacklies et al. | |
| 2004/0105090 A1 | 6/2004 | Schultz | |
| 2004/0212696 A1 | 10/2004 | Tsugita et al. | |
| 2004/0227821 A1 | 11/2004 | Matsuno | |
| 2004/0250288 A1 | 12/2004 | Palmerio | |
| 2004/0257441 A1 | 12/2004 | Pevear | |
| 2005/0018880 A1 | 1/2005 | Mostert et al. | |
| 2005/0031197 A1 | 2/2005 | Knopp | |
| 2005/0190991 A1 | 9/2005 | McCleese | |
| 2005/0261849 A1 | 11/2005 | Kochi et al. | |
| 2005/0265631 A1 | 12/2005 | Mai | |
| 2006/0028549 A1 | 2/2006 | Grindstaff et al. | |
| 2006/0077255 A1 | 4/2006 | Cheng | |
| 2006/0119622 A1 | 6/2006 | Kariathungal et al. | |
| 2006/0215038 A1 | 9/2006 | Gruber et al. | |
| 2006/0239537 A1 | 10/2006 | Shragai et al. | |
| 2006/0268131 A1 | 11/2006 | Cutler | |
| 2007/0003165 A1 | 1/2007 | Sibiryakov | |
| 2007/0046448 A1 | 3/2007 | Smitherman | |
| 2007/0104354 A1 | 5/2007 | Holcomb | |
| 2007/0139736 A1 | 6/2007 | Cutlip et al. | |
| 2007/0188610 A1 | 8/2007 | Micotto | |
| 2007/0263093 A1 | 11/2007 | Acree et al. | |
| 2007/0298869 A1 | 12/2007 | Boesen | |
| 2008/0063270 A1 | 3/2008 | McClelland et al. | |
| 2008/0063299 A1 | 3/2008 | Murai et al. | |
| 2008/0089577 A1 | 4/2008 | Wang | |
| 2008/0123994 A1 | 5/2008 | Schultz et al. | |
| 2008/0204570 A1 | 8/2008 | Schultz et al. | |
| 2008/0221843 A1 | 9/2008 | Shenkar et al. | |
| 2008/0231700 A1 | 9/2008 | Schultz et al. | |
| 2008/0273753 A1 | 11/2008 | Giuffrida et al. | |
| 2009/0041368 A1* | 2/2009 | Leberl et al. | 382/254 |
| 2009/0093959 A1 | 4/2009 | Scherzinger et al. | |
| 2009/0097744 A1 | 4/2009 | Shultz et al. | |
| 2009/0141020 A1 | 6/2009 | Freund et al. | |
| 2009/0256909 A1 | 10/2009 | Nixon | |
| 2010/0013927 A1 | 1/2010 | Nixon | |
| 2010/0277587 A1 | 11/2010 | Pechatnikov et al. | |
| 2011/0199931 A1 | 8/2011 | Anderson et al. | |

FOREIGN PATENT DOCUMENTS

| | | |
|---|---|---|
| EP | 1 963 799 A1 | 9/2008 |
| JP | 62-284214 | 12/1987 |
| JP | 3-503311 | 7/1991 |
| JP | 8-211088 | 8/1996 |
| JP | 2002-202124 | 7/2002 |
| JP | 2003-524306 | 8/2003 |
| JP | 2006-507483 | 3/2006 |
| JP | 2008-39753 | 2/2008 |
| JP | 5642663 B2 | 12/2014 |
| WO | WO 97035166 | 9/1997 |
| WO | WO 99/33026 | 7/1999 |
| WO | WO 99/51027 | 10/1999 |
| WO | WO 03021187 A3 | 3/2003 |
| WO | WO 2004/028134 A2 | 4/2004 |
| WO | WO 2005/100915 | 10/2005 |
| WO | WO 2006/017219 | 2/2006 |
| WO | WO 2007/149322 | 12/2007 |
| WO | WO2008028040 | 3/2008 |
| WO | WO2008101185 | 8/2008 |

OTHER PUBLICATIONS

The Allen Consulting Group, "Economic and employment potential of NearMap aerial photomapping technology", Jul. 2009, 47 pgs., Australia.

Track'Air Aerial Survey Systems, MIDAS, Dec. 19, 2008, 8 pages, www.aerial-survey-base.com/cameras.html, Track'air B.V., The Netherlands.

Nixon, Stuart, "CRCSI Conference Presentation", Sep. 26, 2008.

Wolf, Peter R. and Dewitt, Bon A., "Elements of Photogammetry with Applications in GIS", 3rd ed. Boston: McGraw-Hill, 2000, pp. 383-390.

(56) References Cited

OTHER PUBLICATIONS

Triggs, Bill, et al., "Bundle Adjustment—A Modern Synthesis" Lecture Notes in Computer Science, vol. 1882, (Springer Verlag, Jan. 2000) 75 pgs.
Afek, Y., et al. Mosaicking of Orthorectified Aerial Images; PE&RS, vol. 64, No. 2; Feb. 1998; pp. 115-125.
Kumar, R., et al.; Representation of Scenes from Collections of Images; 1995 IEEE; pp. 10-17.
DigitalGlobe—Basic Stereo Pair Imagery; Dec. 2009; 2 Pgs.
Zhu, Z. et al.; Stereo Mosaics from a Moving Video Camera for Environmental Monitoring; Article from First International Workshop on Digital and Computational Video; Dec. 10, 1999; 10 Pgs.
Zhu, Z., et al.; Mosaic-Based 3D Scene Representation and Rendering; 4 Pgs.
Grocholsky, B., et al.; Cooperative Air and Ground Surveillance—A Scalable Approach to the Detection and Localization of Targets by a Network of UAVs and UGVs; IEEE Robotices & Automation Magazine; Sep. 2006; pp. 16-26.
Eisenbeiss, H.; A Mini Unmanned Aerial Vehicle (UAV): System Overview and Image Acquisition; Nov. 18-20, 2004; 7 Pgs.
Optech—ILRIS-3D Operation Manual; Nov. 2006; 150 Pgs.
Gasparini, F., et al.; Color Balancing of Digital Photos Using Simple Image Statistics; pp. 1-39.
Bunis, L.; ITT—Aerial Photography Field Office—National Agriculture Imagery Program (NAIP) Suggested Best Practices—Final Report; Feb. 1, 2007; pp. 1-34.
Bunis, L.; ITT—Aerial Photography Field Office—Scaled Variations Artifact Book; Feb. 1, 2007; 21 Pgs.
Wu, X., et al.; A Colour-Balancing Method and its Applications; 8 Pgs.
Frueh C., et al.; Automated Texture Mapping of 3D City Models with Oblique Aerial Imagery; 8 Pgs.
Lin, C. et al.; 3-D Descriptions of Buildings from an Oblique View of Aerial Image; 1995 IEEE; pp. 377-382.
Hsieh Y.; SiteCity: A Semi Automated Site Modelling System; 1996 IEEE; pp. 499-506.
Neumann, K. J.; Operational Aspects of Digital Aerial Mapping Cameras; 4 Pgs.
Sandau, R., et al.; Design Priniciples of the LH Systems ADS40 Airborne Digital Sensor; IAPRS, vol. XXXIII, Amsterdam, 2000; 8 Pgs.
Hinz, A., et al.; Digital Modular Camera: System Concept and Data Processing Workflow; IAPRS, vol. XXXIII, Amsterdam, 2000; 8 Pgs.
Ratib, O.; PET/CT Image Navigation and Communication; The Journal of Nuclear Medicine, vol. 45, No. 1 (Suppl); Jan. 2004; pp. 46S-55S.
Snavely, N., et al.; Modeling the World from Internet Photo Collections; Accepted: Oct. 31, 2007; 22 Pgs.
Abidi, M., et al.; Hybrid 3D Modeling of Large Lanscapes from Satellite Maps; Project in Lieu of Thesis for Master's Degree, The University of Tennessee, Knoxville, Fall 2003; pp. 1-61.
International Search Report dated Dec. 8, 2010 in International Application No. PCT/IB2010/002380.
U.S. Appl. No. 12/101,167, filed Apr. 11, 2008, 2009-0256909, Nixon.
U.S. Appl. No. 12/565,232, filed Sep. 23, 2009, 2010-0013927, Nixon.
U.S. Appl. No. 13/873,818, filed Apr. 30, 2013, Nixon.

Office Action dated Jun. 5, 2013, in Chinese Patent Application No. 200980112723.8 (with English-language Translation).
Office Action dated Sep. 10, 2013, in Japanese Patent Application No. 2011-503521 (with English-language Translation).
Commercial Off-the-Shelf, Wikipedia, Wikimedia Foundation, Inc. (non-profit organization), search date: Aug. 29, 2013, Internet <URL: http://ja.wikipedia.org/w/index.php?title=%E5%95%86%E7%94%A8%E3%82%AA%E3%83%95%E3%82%B6%E3%82%B7%E3%82%A7%E3%83%AB%E3%83%95&oldid=19066904.
Pierre J. Turon, et al. "LEO Thermal Imagers: Push Broom or Whisk Broom?", Proc. SPIE, Infrared Imaging Systems, Sep. 16, 1992, vol. 1689, pp. 396-405.
Paul F. Crickmore, "Lockheed Blackbird: Beyond the secret missions", Chapter 5: SR-71 technical briefing, 2004, pp. 135-139 with cover page.
Mike Hull, et al., "The SR-71 Sensor Pages, SR-71 Cameras (Optical); Payloads; Side Looking Radar and Defensive Systems", http://www.wvi.com/~sr71webmaster/sr_sensors_pg1.htm, Last Revised: Aug. 18, 2007, 19 pages.
Office Action dated Dec. 9, 2013 in Chinese Patent Application No. 200980112723.8 with English language translation.
Combined Office Action and Search Report dated Dec. 12, 2013 in Chinese Patent Application No. 201080042498.8 with English language translation.
Office Action dated Jun. 23, 2014, in Chinese Patent Application No. 200980112723.8 (with English-language Translation).
Office Action dated Jul. 21, 2014, in Chinese Patent Application No. 201080042498.8 (with English-language Translation).
"Elements of Photogrammetry with Applications in GIS" $3^{rd}$ Edition by Wolf and Dewitt, McGraw Hill, 2000, pp. 217-225 and pp. 342-344.
Office Action dated Apr. 1, 2014 in Japanese Patent Application No. 2012-530353 (with English language translation).
Supplementary European Search Report dated Nov. 20, 2014, in European Patent Application No. 09729505.9.
Office Action dated Oct. 2, 2014, in Russian Patent Application No. 2012116074 filed Sep. 22, 2010 (with English-language Translation).
Office Action dated Mar. 17, 2015 in Japanese Patent Application No. 2012-530353 (with English translation).
U.S. Appl. No. 14/310,523, filed Jun. 20, 2014, Tarlinton et al.
U.S. Appl. No. 14/478,380, filed Sep. 5, 2014, Tarlinton et al.
U.S. Appl. No. 14/618,551, filed Feb. 10, 2015, Millin et al.
U.S. Appl. No. 14/687,544, filed Apr. 15, 2015, Lapstun et al.
Office Action dated Apr. 29, 2016 in Korean Patent Application No. 10-2012-7009283 (with English-language Translation).
Office Action dated Sep. 21, 2015 in European Patent Application No. 09 729 505.9.
Office Action dated Mar. 8, 2016 in Japanese Patent Application No. 2012-530353 (with English-language Translation).
Office Action dated Jun. 13, 2017 in Japanese Patent Application No. 2016-114465 (with English-language Translation).
Supplementary European Search Report dated Jul. 27, 2017 in European Patent Application No. 10818480.5.
Office Action dated Feb. 23, 2018 in Indian Patent Application No. 2253/DELNP/2012, citing document AO therein, 11 pages.
Office Action dated Sep. 26, 2017 in Japanese Patent Application No. 2016-114465 (with English-language Translation).
Office Action dated Jul. 15, 2016 in Canadian Patent Application No. 2,773,303.

* cited by examiner

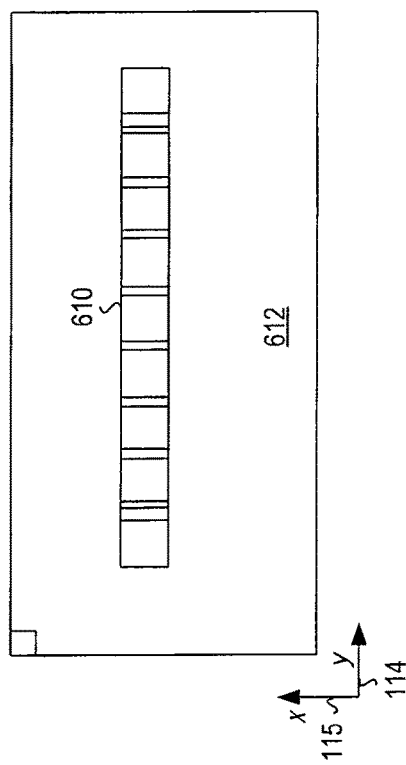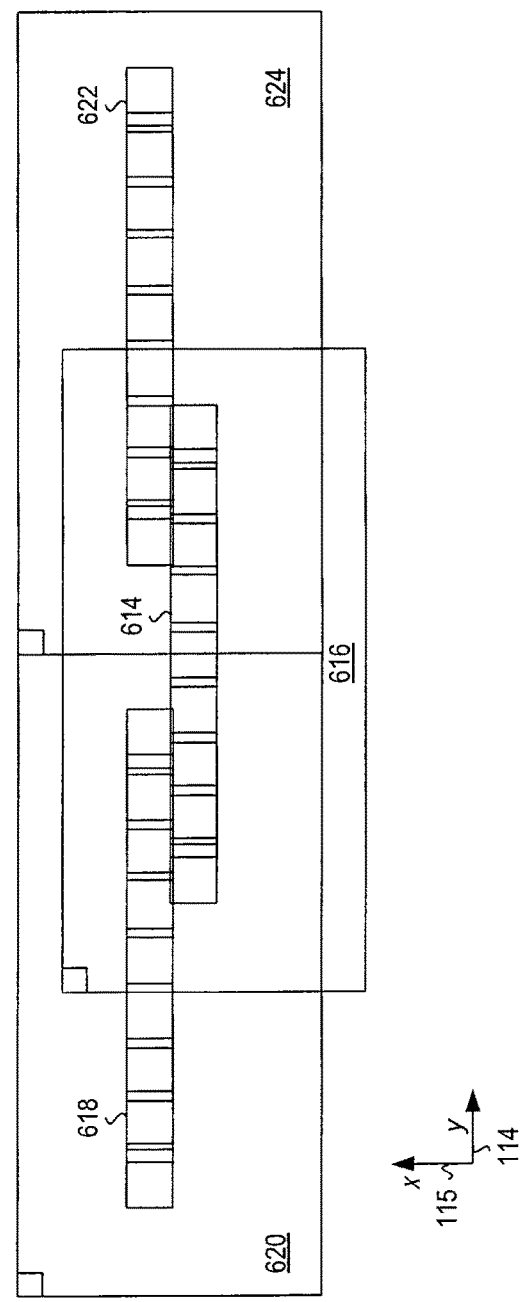

TABLE I: CAMERA BODY DETAILS

| CAMERA BODY DETAILS | Canon 1Ds MkII | Canon 1Ds MkIII | Nikon D3X | Nikon D3X |
|---|---|---|---|---|
| Resolution (megapixels) | 16.6 | 23.0 | 12.0 | 24.0 |

TABLE II: VERTICAL OVERVIEW

| VERTICAL OVERVIEW | Canon 1Ds MkII | Canon 1Ds MkIII | Nikon D3 | Nikon D3X |
|---|---|---|---|---|
| Focal Length (mm) | 28.0 | 28.0 | 28.0 | 28.0 |
| Number of Cameras | 1 | 1 | 1 | 1 |
| Lens FOV Wide (degrees/lens) | 65.4 | 65.4 | 65.4 | 65.4 |
| Lens FOV High (degrees/lens) | 46.3 | 46.3 | 46.3 | 46.3 |
| Across Center Angle (degrees from vertical) | 0 | 0 | 0 | 0 |
| Along Center Angle (degrees from vertical) | 0 | 0 | 0 | 0 |
| Filter Diameter (mm) | 52 | 52 | | |
| Installation Angle Spacing (degrees) | n/a | n/a | n/a | n/a |

TABLE III: REAR OVERVIEW

| REAR OVERVIEW | Canon 1Ds MkII | Canon 1Ds MkIII | Nikon D3 | Nikon D3X |
|---|---|---|---|---|
| Focal Length (mm) | 28.0 | 28.0 | 28.0 | 28.0 |
| Number of Cameras | 1 | 1 | 1 | 1 |
| Lens FOV Wide (degrees/lens) | 65.4 | 65.4 | 65.4 | 65.4 |
| Lens FOV High (degrees/lens) | 46.3 | 46.3 | 46.3 | 46.3 |
| Across Center Angle (degrees from vertical) | 0 | 0 | 0 | 0 |
| Along Center Angle (degrees from vertical) | 35 | 35 | 35 | 35 |
| Filter Diameter (mm) | 52 | 52 | | |
| Installation Angle Spacing (degrees) | n/a | n/a | n/a | n/a |

*Fig. 8A*

TABLE IV: VERTICAL HIGH RESOLUTION

| VERTICAL HIGH RESOLUTION | Canon 1Ds MkII | Canon 1Ds MkIII | Nikon D3 | Nikon D3X |
|---|---|---|---|---|
| Focal Length (mm) | 200.0 | 200.0 | 180.0 | 180.0 |
| Number of Cameras | 5 | 5 | 5 | 5 |
| Lens FOV Wide (degrees/lens) | 10.3 | 10.3 | 11.4 | 11.4 |
| Lens FOV High (degrees/lens) | 6.9 | 6.9 | 7.6 | 7.6 |
| Across Center Angle (degrees from vertical) | 0 | 0 | 0 | 0 |
| Along Center Angle (degrees from vertical) | 0 | 0 | 0 | 0 |
| Filter Diameter (mm) | 72 | 72 | | |
| Installation Angle Spacing (degrees) | 9.5 | 9.5 | 10.5 | 10.5 |

TABLE V: RIGHT OBLIQUE

| RIGHT OBLIQUE | Canon 1Ds MkII | Canon 1Ds MkIII | Nikon D3 | Nikon D3X |
|---|---|---|---|---|
| Focal Length (mm) | 200.0 | 200.0 | 180.0 | 180.0 |
| Number of Cameras | 3 | 3 | 3 | 3 |
| Lens FOV Wide (degrees/lens) | 10.3 | 10.3 | 11.4 | 11.4 |
| Lens FOV High (degrees/lens) | 6.9 | 6.9 | 7.6 | 7.6 |
| Across Center Angle (degrees from vertical) | 45 | 45 | 45 | 45 |
| Along Center Angle (degrees from vertical) | 0 | 0 | 0 | 0 |
| Installation Angle Spacing (degrees) | 9.5 | 9.5 | 10.5 | 10.5 |

TABLE VI: REAR OBLIQUE

| REAR OBLIQUE | Canon 1Ds MkII | Canon 1Ds MkIII | Nikon D3 | Nikon D3X |
|---|---|---|---|---|
| Focal Length (mm) | 135.0 | 135.0 | 135.0 | 135.0 |
| Number of Cameras | 3 | 3 | 3 | 3 |
| Lens FOV Wide (degrees/lens) | 15.2 | 15.2 | 15.2 | 15.2 |
| Lens FOV High (degrees/lens) | 10.1 | 10.1 | 10.1 | 10.0 |
| Across Center Angle (degrees from vertical) | 0 | 0 | 0 | 0 |
| Along Center Angle (degrees from vertical) | 50 | 50 | 50 | 50 |
| Installation Angle Spacing (degrees) | 14.5 | 14.5 | 14.5 | 14.5 |

*Fig. 8B*

TABLE VII: CAMERA BODY DETAILS

| CAMERA BODY DETAILS | Canon 1Ds MkII | Canon 1Ds MkIII | Nikon D3X | Nikon D3X |
|---|---|---|---|---|
| Resolution (megapixels) | 16.6 | 23.0 | 12.0 | 24.0 |

TABLE VIII: VERTICAL OVERVIEW

| VERTICAL OVERVIEW | Canon 1Ds MkII | Canon 1Ds MkIII | Nikon D3 | Nikon D3X |
|---|---|---|---|---|
| Focal Length (mm) | 28.0 | 28.0 | 28.0 | 28.0 |
| Number of Cameras | 1 | 1 | 1 | 1 |
| Lens FOV Wide (degrees/lens) | 65.4 | 65.4 | 65.4 | 65.4 |
| Lens FOV High (degrees/lens) | 46.3 | 46.3 | 46.3 | 46.3 |
| Across Center Angle (degrees from vertical) | 0 | 0 | 0 | 0 |
| Along Center Angle (degrees from vertical) | 0 | 0 | 0 | 0 |
| Filter Diameter (mm) | 52 | 52 | | |
| *Installation Angle Spacing (degrees)* | *n/a* | *n/a* | *n/a* | *n/a* |

TABLE IX: VERTICAL HIGH RESOLUTION

| VERTICAL HIGH RESOLUTION | Canon 1Ds MkII | Canon 1Ds MkIII | Nikon D3 | Nikon D3X |
|---|---|---|---|---|
| Focal Length (mm) | 300 | 300 | 300 | 300 |
| Number of Cameras | 9 | 9 | 9 | 9 |
| Lens FOV Wide (degrees/lens) | 6.87 | 6.87 | 6.87 | 6.87 |
| Lens FOV High (degrees/lens) | 4.58 | 4.58 | 4.58 | 4.58 |
| Across Center Angle (degrees from vertical) | 0 | 0 | 0 | 0 |
| Along Center Angle (degrees from vertical) | 0 | 0 | 0 | 0 |
| Filter Diameter (mm) | 72 | 72 | | |
| *Installation Angle Spacing (degrees)* | *9.5* | *9.5* | *10.5* | *10.5* |

*Fig. 8C*

METHOD AND SYSTEM FOR CREATING A PHOTOMAP USING A DUAL-RESOLUTION CAMERA SYSTEM

CROSS REFERENCE TO RELATED APPLICATION

This application is a Continuation of U.S. patent application Ser. No. 12/565,232, filed Sep. 23, 2009, which is a Continuation in Part of U.S. patent application Ser. No. 12/101,167, filed Apr. 11, 2008, and entitled Systems and Methods of Capturing Large Area Images in Detail Including Cascaded Cameras and/or Calibration Features, the entire contents of each of which are incorporated herein by reference.

COPYRIGHT NOTICE AND AUTHORIZATION

Portions of the documentation in this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

BRIEF DESCRIPTION OF THE DRAWINGS

The following detailed description will be better understood when read in conjunction with the appended drawings, in which there is shown one or more of the multiple embodiments of the present disclosure. It should be understood, however, that the various embodiments of the present disclosure are not limited to the precise arrangements and instrumentalities shown in the drawings.

In the Drawings:

FIGS. 6A-6B are diagrams illustrating exemplary overview and detail image representations;

FIGS. 8A-8C are tables illustrating representative camera configurations for two embodiments of exemplary systems for capturing overview and detail images;

DETAILED DESCRIPTION

Figure 1:
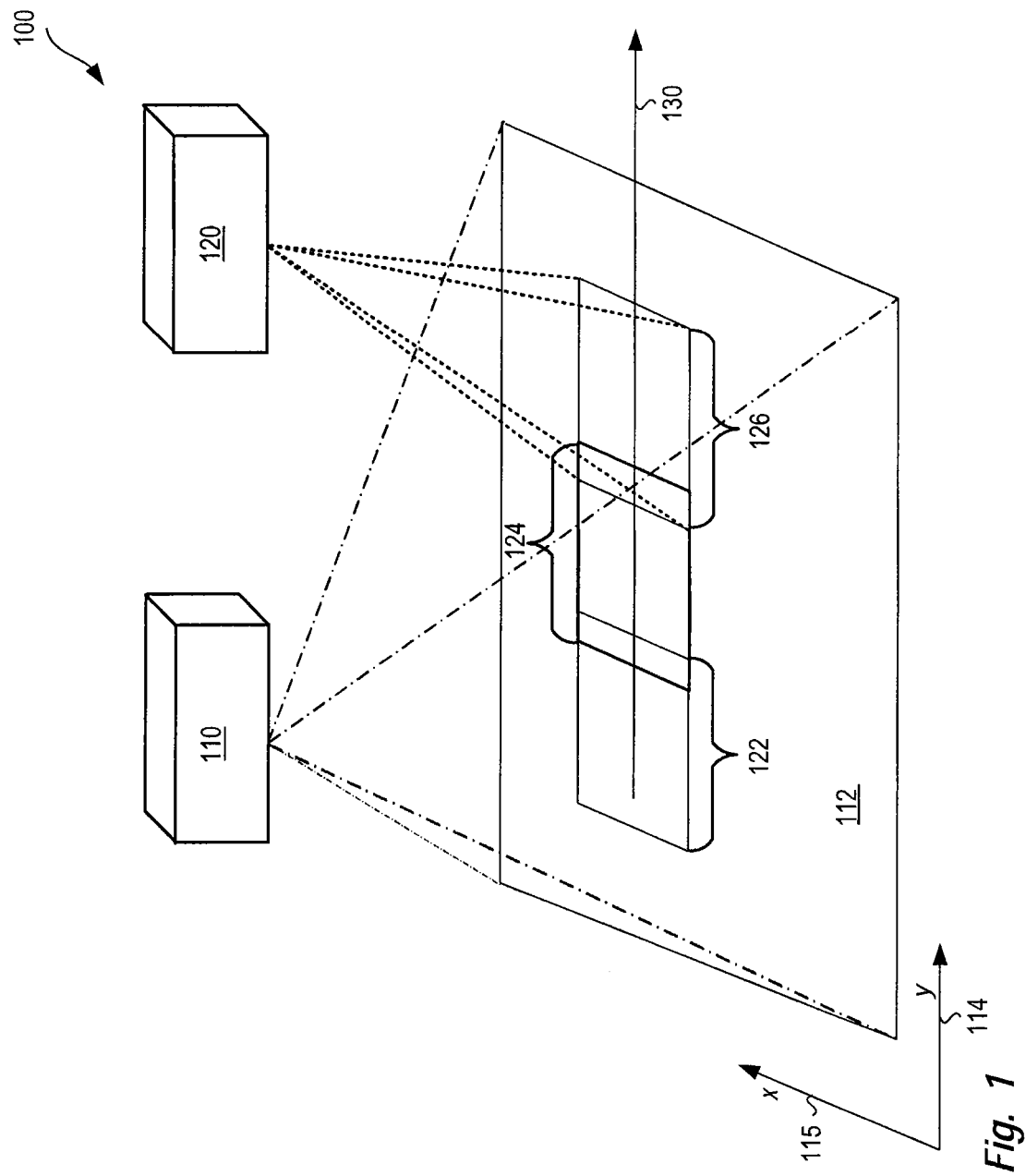
FIG. 1 is a block diagram of an exemplary system for capturing overview and detail images.

Certain terminology is used herein for convenience only and is not to be taken as a limitation on the embodiments of the present disclosure. In the drawings, the same reference letters and numerals are employed for designating the same elements throughout the several figures.

The words "right", "left", "lower" and "upper" designate directions in the drawings to which reference is made. The words "forward" and "sideways" refer to directions of travel of a vehicle, aircraft, spacecraft, submarine or other platform which is translated with respect to the ground. The terminology includes the words above specifically mentioned, derivatives thereof and words of similar import.

The term "resolution" when used herein with respect to an image refers to the ability to distinguish imaged objects, with the resolution typically being given in cm and in reference to object(s) on the ground. When used in that context, resolution can be variously termed ground sample distance, resolution cell, ground resolution, or ground pixel resolution. When used with respect to a camera or other imaging device, the resolution may refer to the density of pixels of that imaging device. As will be understood by one of skill in the art, the resolution of the image (ground sample distance, resolution cell, ground resolution, or ground pixel resolution) is dependent on many parameters, including not only the resolution of the camera but other variables including without limitation the imaging system (e.g. lenses) and operating conditions (e.g. altitude) at which the images are captured.

Aerial and satellite imagery of the earth is used for a wide range of military, commercial and consumer applications. A number of emerging applications include serving photo imagery maps on the Internet, and services based on the generation of those photomaps (e.g. maps and directions, real estate values). In general, there is an increasing demand for photo imagery maps, and recently updated photomaps. However, existing systems for the generation of photomaps often involve overly complex components, require high capital expenditures, and/or have high operating costs, among other drawbacks. They are unable to yield imagery within short timeframes and operating regimes, or otherwise provide the high resolution presently desired.

In general, existing photogrammetry imagery solutions fail to meet the increasing demand for more timely and higher resolution imagery because of their inability to capture sufficient amounts of the appropriate high resolution data in an efficient manner. According to principles consistent with certain aspects related to the innovations herein, camera systems used for aerial photogrammetry must address two conflicting requirements.

First, it is vital that the camera system's lens and focal system parameters (known as interior orientation), as well as its position in space and look angle (known as exterior orientation) are precisely calculated. A photogrammetric solution known as bundle adjustment may be used to calculate interior and exterior orientation information for the camera and for each photo taken by the camera. Such calculations often represent a pre-requirement for enabling merging of individual photos into seamless photomaps. One way of achieving the required level of accuracy is to take multiple images, with a large amount of redundant data between photos. Common features, common elements, common points, or image elements visible in multiple photos can then be identified and used to calculate camera interior and exterior parameters. However, even with large amounts of redundant data between photos it can be difficult to identify common points or image elements if the photos have been taken at different times or under different conditions (e.g. different altitudes, different times of day) since the common points or image elements may have moved or may have differences in appearance (e.g. different shadowing due to changes in illumination) that makes correlation between those common points or image elements difficult.

Second, it is desirable that aerial surveys be completed quickly. This provides several advantages such as reduced operating costs and minimized delays stemming from unfavorable environmental or surveying conditions such as inclement weather. An effective way to increase the amount of ground area captured, measured in $km^2$ per hour, is to minimize the amount of redundancy between the detailed high resolution photos which are subsequently used to generate photomaps.

As such, the desire to increase redundancy among images to enable accurate photogrammetric positioning of the images must be balanced with the desire to decrease redundancy between photos to complete surveys at a lower cost.

Collection of aerial photomap data can be accomplished by flying an aircraft equipped with aerial imaging devices (e.g. cameras) along a flight plan which involves flying along a relatively straight path, banking and turning the aircraft to turn 180° to fly a parallel return path with some sideways displacement from the original path, and repeating this pattern until a designated area of the ground has been photographed. As will be understood by one of skill in the art, images or photographs are captured at periodic intervals along the straight part of the flight plan to create photographs with forward overlap, and the flight plan is designed such that the images captured have side-to-side overlap.

Overlap in images can be created by a number of mechanisms. For example, an imaging system that is being translated along an axis or generally moved above the ground in a vehicle (e.g. an aircraft) can capture images periodically. The timing between the images (photos) captured can be arranged such that the photos have overlap in the direction of travel. Overlap resulting from the forward direction of travel is commonly referred to as forward overlap. Photos that are taken one after another in such a system and which have the aforementioned forward overlap can be referred to as sequential or adjacent photos. In a flight plan with a forward path and a return path, sideways overlap is created by spacing the forward path and return path such that images captured along those paths have a desired degree of overlap. Overlap resulting from the spacing of the forward and return paths in the flight path is commonly referred to as side overlap. Finally, imaging systems or cameras can be arranged within an image capturing system such that they point at different areas of the ground below, with overlap between the captured images being created due to the mechanical arrangement of the imaging capture (e.g. camera) systems.

Although the amount of forward and side overlap may vary from application to application, a common overlap of current aerial mapping systems is 80/30, indicating 80% forward overlap with sequential photos along a flight line and 30% side overlap with photos in adjacent parallel flight lines. In such a configuration, capturing sequential images during forward translation in one flight line would result in only 20% of each image containing new information. Collecting data in this manner allows a feature, image element or common point to be identified within about 5 images. In terms of redundancy for the aforementioned example, any point, pixel, set of pixels, element, image element, object, or feature in that common area has a redundancy of 4 (original plus four more identifiable images of that point or object). As such a set of sequential images having 80% overlap could be considered to have a redundancy of 4. In general, redundancy can be described as the number of images (in a set of images) in which a point appears on average, minus one. The points which are captured redundantly may or may not be used as image elements, but such points or pixels appear in multiple images within the set. As will be understood by one of skill in the art, for high values of redundancy the number of images in which a point appears in on average (n), which approximates the redundancy (n−1). The amount of redundant information in the sets of images would be further increased by side overlap, resulting in only about 14% of each image containing new information and about 86% of the image information being redundant in terms of the final photomap. As will be understood by one of skill in the art, increasing overlap, whether it be forward overlap, side overlap, or overlap generated by other operations or mechanical configurations, will increase the redundancy in the sets of images.

Figure 5B:
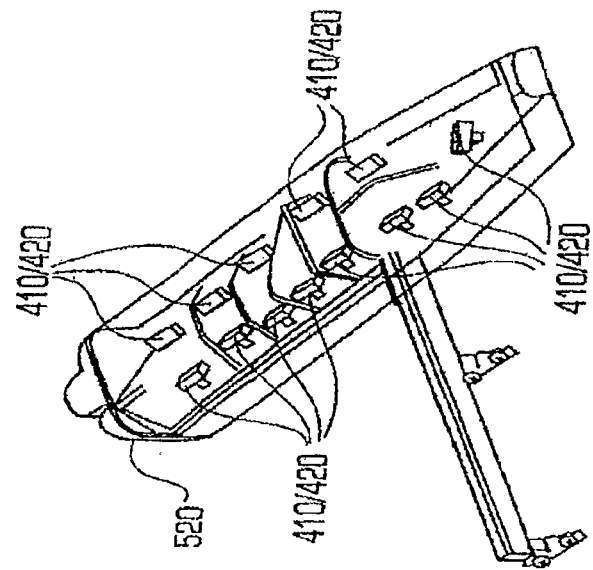
FIG. 5B illustrates one exemplary implementation of image capturing subsystems mounted within an external pod.

In one embodiment of the present systems and methods, at least two imaging systems/subsystems are used to capture overview images and detail images. In another embodiment, at least two imaging systems/subsystems are used to capture overview images at a first level of resolution, and detail images at a second level of resolution, the second level of resolution being higher (more image detail) than the first level of resolution. As illustrated in FIG. 1, detail images 122, 124 and 126, captured by second system 120, fall partially or completely within the capture area of an overview image 112, captured by first system 110. The first and second systems 110 and 120 can be translated, typically along X-axis 115. FIGS. 5C and 5D illustrate capture of detail and overview images from a plane and along a typical flight survey path respectively. Images are collected such that significant overlap exists in the overview images, but overlap in the detail images is significantly reduced or minimized with respect to the amount of overlap in the overview images. Similarly, the amount of overlap of the detail images in one or more embodiments of the present systems and methods is greatly reduced with respect to images obtained in other traditional photomap imaging systems. By having a significant amount of overlap in the overview images, high redundancy exists in those low resolution images, that redundancy being used for image processing related to photomap generation. The detail images, which are at the desired resolution for the photomaps, have a much lower amount of redundancy, thus reducing storage and processing requirements for those images.

Greater levels of redundancy or overlap increase the ability to precisely calculate exterior and interior orientation for the camera system. However, increased redundancy is largely wasted when creating a final photomap, as significantly more image data is captured than is needed to create the final photomap. Collection of this excess data increases the time and costs involved in flying the survey. For example, if a traditional aerial imaging system is flown at an altitude sufficient to produce a 10 cm ground pixel size photomap using an 80/30 overlap, approximately 100 Terabytes (TB) of image data would need to be collected to generate a final photomap that is approximately 14 TB in size. As such, the 10 cm ground pixel resolution images will have a redundancy of about 6 (corresponding to only about 14% new information in each image) and those images will serve both for calculation of the exterior and interior orientation of the camera system, as well as for the generation of the final photomap.

Alternatively, use of the present methods and systems would allow the use of a first camera system providing 100 cm ground pixel size at a high redundancy (e.g. 98) with a very low unique area covered per photo (approximately 1%) and a second camera system providing high resolution at 10 cm with a high unique area per photo of 80%. Using this technique and system would require about 15 TB for the high redundancy photo set and about 15 TB for the low redundancy photo set, for a total storage requirement of less than 30 TB. Furthermore, because of the high redundancy (98) in the low resolution photos, the post processing can achieve higher robustness (fewer errors) and higher accuracy than with lower redundancy images at higher resolution. For example, if the traditional system has a Root Mean Square (RMS) error of 0.5 pixels, the absolute ground error would be 5 cm (0.5*10 cm). Using the present methods and systems, the high redundancy photos may enable a post processing RMS of 0.1 pixels, for an absolute ground error of 0.1*100 cm=10 cm. This can be further improved by locating the high detail images within the high redundancy images, resulting the ability to achieve absolute ground error levels that are comparable to or less than previous systems.

In one embodiment the present methods and systems employs the use of multiple camera sets, each camera set potentially comprising multiple cameras. As such, resolution is not limited to that of current camera systems. For example, current camera systems such as those offered by the Vexcel corporation can have a resolution of 300 megapixels, but this is achieved through the use of multiple cameras that are mounted in an extremely rigid platform and pre-calibrated. Using the present methods and systems it is possible to create a virtual camera system of extremely high resolution (e.g. 10 gigapixels).

Because of the demanding requirements for aerial photography the camera systems are typically custom built for the particular aerial photography application. Traditional systems cannot take advantage of Commercial Off The Shelf (COTS) components, and as such cannot easily take advantage of advanced in digital photography, such as the relatively low (and continually decreasing) cost of professional Digital Single Lens Reflex (D-SLR) cameras. The heavy weight and high cost of the camera systems required using traditional approaches encourages or requires the use of twin-engine turbo-prop aircraft, which further drives up operating costs, as such aircraft are significantly more expensive to operate than common single engine commercial aircraft such as the Cessna 210. In addition, use of traditional systems common requires custom modifications to the aircraft for camera mounting. In contrast, the present methods and systems allow, in certain embodiments, the ability to use single engine aircraft, having lower operating costs than twin-engine aircraft, and do not require modification to the aircraft frame.

Using the present methods and systems high resolution digital images can be captured over large areas for airborne or space-borne photomap surveys. Data collection times can be significantly reduced over current systems. As such, capital and operating costs can be reduced, and flight surveys can be rapidly conducted when weather permits. In certain embodiments high resolution surveys can be captured from high altitudes, thus reducing the impact on Air Traffic Control, providing smoother flying conditions for the flight survey crew, and generally reducing pilot workload.

Additionally, different types of cameras, or cameras used at different angles, can be utilized to collect the images of different resolutions and with different degrees of redundancy. For example, in the collection of image data for photogrammetry applications, overhead cameras can be used to collect overview images at a relatively low resolution with a high degree of redundancy, and oblique cameras can be used to collect high resolution data with a low degree of redundancy. Other combinations of cameras and resolutions/redundancies are possible, both for photogrammetric applications as well as in other applications. Using the present methods and systems, different types of cameras may be combined to generate nadir photo maps, oblique photomaps, infrared photomaps, or other combinations as dictated by the survey requirements.

Although described herein as systems of detail and overview cameras, additional sets of cameras (or other types of image capturing devices) can be incorporated to form cascades of image capturing systems operating with different resolutions and different amounts of redundancy. By having higher degrees of redundancy in lower resolution images than in the higher resolution images, it is possible to have the appropriate amount of redundancy for image processing (e.g. bundle adjustment, digital elevation map generation) while at the same time minimizing the amount of redundancy in the higher resolution images. For example, the method and system described herein can be utilized with three sets of cameras, the first set of cameras operating at a low resolution with high redundancy, the second set of cameras operating at a medium resolution with a medium redundancy, and the third set of cameras operating at a high resolution with low redundancy. In general, cascading can be performed using multiple sets of cameras which capture images with differing degrees of overlap, resolution and/or redundancy, such that the resulting sets of lower resolution images have higher redundancy than sets of images taken at a higher resolution. As will be understood by one of skill in the art, the cascade of cameras can be extended to n cameras or n sets of cameras, without limitations to specific physical arrangements. The cascade of cameras can produce images with a spectra of resolutions, consistent with the redundancy being lower in the higher resolution images. A set of cameras, whether organized in a linear fashion, in an array (row and column format), or in a hierarchy of magnifications can be considered to be organized in a cascaded manner when the result is a plurality of captured images having different ground resolutions. As an example, a set of four cameras arranged as an array can be organized in a cascaded manner by capturing images at different ground resolutions, or at different ground resolutions with different magnifications. If the cameras are organized to cover the same or overlapping ground areas, there will be redundant image data between the captured images.

As understood by one skilled in the art, after the imagery has been captured, whether through these or prior art methods, it can be processed using photogrammetry tools in order to produce a number of applications such as photomaps or digital elevation maps. Common software programs used for such processing include, but are not limited to, one or more of the following programs: Match-AT triangulation software sold by the Inpho Corporation; digital mapping software sold under the trademark Socet Set® by BAE Systems®; Socet Set® software which is integrated with photogrammetric bundle adjustment software sold as BINGO by GIP mbH; and ERDAS ER Mapper image processing software sold by ERDAS®. Additionally, a wide variety of image processing and triangulation software sold by a variety of vendors may be used to process the data.

The imaging systems/subsystems for overview and detail image capture can be co-located on a suitable vehicle for image capture (e.g. aircraft, spaceship, submarine, balloon) or may be located on separate platforms. In several embodiments the overview and detail imaging systems are co-located in a housing (e.g. pod) which attaches to a small aircraft. In one or more embodiments, the overview and detail images are captured substantially simultaneously. An image capture signal can be generated from a timing system/subsystem (e.g. a system controller) which facilitates the near simultaneous capture of the detail and overview images.

In one or more embodiments of the present systems and methods, the overview images are collected such that there is an overlap of sequentially captured overview images (hereafter referred to as sequential overview images) of greater than or equal to 50% in the forward direction. In an alternate embodiment, the overlap of sequential overview images in the forward direction is at least 90%. In one embodiment the overlap of the sequential detail images in the forward direction is in the range of 0% to 20%. Other embodiments with other combinations of overlap are possible as will be understood by one of skill in the art, and consistent with having the degree of overlap in the sequential detail images significantly lower than the degree of overlap in the sequential overview images.

In one embodiment of the present methods and systems, a first image capture system is used to capture an overview image of an overview area, while a second image capture system captures, at substantially the same time, a detail image of at least a portion of the overview area, with redundancy existing between the overview images, and redundancy existing between the detail images.

In terms of redundancy, in one embodiment the redundancy in the overview images is greater than 10, whereas the redundancy in the detail images is less than or equal to 10. In another embodiment the redundancy in the detail images approaches zero. In yet another embodiment the redundancy in the detail images is occasionally less than zero (negative) indicating gaps in the captured images. Because of the high redundancy in the overview images, the gaps in the detail images can be recreated or filled in through subsequent image processing.

As will be appreciated by one of skill in the art, the degree of redundancy can be varied depending on the environment or conditions under which the images are being collected. In poor visibility or rapidly changing environments, the degree of redundancy will need to be extremely high. For example, in foggy/dusty conditions, or in underwater applications, the solution can be biased towards greater redundancy. This can be accomplished through various mechanisms including the use of more overview cameras or by having more frequent image capture (even approaching video frame rates). In the case of underwater applications, multiple 270° sensors, running at close to video frequency, could be used to collect overview type images with very high redundancy, while a single camera could be used to take very high resolution/low redundancy images. Conversely, in an environment which changes less over time (e.g. viewing of an entire planet from space) the degree of redundancy in the overview images could be reduced.

In one application, overview and detail images are collected simultaneously, hence insuring that redundant images contain a sufficient number of potential common features, common elements, common points, or image elements, and minimizing the effects of movements of objects or changes in illumination. In another embodiment the overview and detail images are captured from approximately the same location. In yet another embodiment, the overview and detail images are captured simultaneously from approximately the same location.

In one or more embodiments of the present system and methods, the image capture systems/subsystems utilize digital cameras. In one or more embodiments the digital cameras are CMOS based cameras or sensors. In an alternate embodiment a push broom sensor is used, and in yet another embodiment a whisk broom sensor is used for image capture. Other mechanisms for image capture of both overview and detail images can be utilized, including but not limited to analog film systems, point or linear scanners, CCD imaging arrays, other III-V or II-VI based imaging devices, ultrasound imagers, infrared (thermographic) imagers. The imagers operate on the basis of receipt of electromagnetic rays and can operate in the infrared, visible, or other portions of the electromagnetic spectrum. Large format and multiple lens, multiple detector, and multiple detector/lens systems such as those described in U.S. Pat. No. 7,009,638 to Gruber et al., and U.S. Pat. No. 5,757,423 to Tanaka et al., the entire disclosures of which are incorporated herein by reference, can also be used to capture overview or detail images. Additionally, multiple image collection systems such as the Multi-cameras Integrated Digital Acquisition System (MIDAS) offered by the TRACK'AIR corporation, and other systems configured to provide detailed metric oblique views can be adopted to and incorporated into the present methods and systems.

In one or more embodiments of the present system and methods, a timing system/subsystem is utilized to generate image capture signals which are fed to the image capture systems/subsystems and cause capture of the overview and detail images. In one or more embodiments the timing system/subsystem is based on a microcontroller or microprocessor with appropriate software, firmware, and accompanying hardware to generate electronic or optical signals which can be transmitted, via cabling or through space (e.g. wirelessly) to the image capturing systems/subsystems. Alternatively, a specialized electronic hardware device, working in conjunction with a navigation system, such as a GPS based navigation system, or alone, can act as the timing system/subsystem to generate image capture signals. In one or more embodiments, the image capture signals are generated at a system controller in the form of a computer (e.g. laptop or ruggedized computer) and are received by digital cameras which form the imaging systems for the overview and detail cameras. There is inherent skew in the transmission of the signals over cables (typically having different lengths) and delays inherent to the digital cameras such that there are variations in the actual capture time of the images, although use of one or more synchronized image capture signals results in the substantially simultaneous capture of the images.

In one or more embodiments, the image capture signal is a one-way signal emanating from the timing system/subsystem, and no return signals from the image capture systems/subsystems are needed. Similarly, the image capture data can be stored locally in the imaging devices (e.g. digital cameras) and no image data needs to be returned from the imaging devices to the controller or other data storage devices. Data storage used for the storage of the images includes, but is not limited to: solid state memory devices such as flash memory, Static Random Access Memory (SRAM), Dynamic Random Access Memory, (DRAM);

magnetic storage devices including but not limited to tapes, magnetic drums, core memory, core rope memory, thin film memory, twistor memory, and bubble memory; electromagnetic storage devices including but not limited to hard or disk drives and floppy drives; optical storage devices including but not limited to photographic film, holographic memory devices and holograms, and optical disks; and magneto-optic drives and data storage devices.

FIG. 1 is a block diagram of an exemplary system 100 consistent with certain aspects related to the present methods and systems. Referring to FIG. 1, system 100 may comprise a first system 110 that acquires at least one overview image 112, and a second system 120 that acquires detail images 122, 124, 126. The system can be oriented in an x-y coordinate system as illustrated in FIG. 1 and in accordance with x-axis 115 and y-axis 114. In one embodiment, imaging capture devices (e.g. cameras) are arranged to capture detail images 122, 124, 126 in strips along a detail axis 130, with detail axis 130 being generally parallel with y-axis 114.

First and second systems 110 and 120 may each include one or more image capturing devices, for example, cameras (throughout this disclosure, the broad term "image capturing device" is often referred to as "camera" for purpose of convenience, not limitation). Furthermore, an imaging array can be created through an arrangement of individual sensors that are used to capture an image, and can act as an individual image capturing device or camera. Individual cameras or image capture devices can be arranged in a linear arrangement, arranged along an axis and set at varying angles to capture different areas of the ground, or arranged in a matrix or array (row and column) format. When arranged such that the image capturing devices capture adjacent or proximate image areas, whether overlapping or not overlapping, the devices can be considered to be arranged in an adjacent manner.

In one embodiment first system 110 and second system 120 are translated in an x direction with images captured periodically such that a high degree of overlap is created in the sequential overview images captured by first system 110, and a lesser degree of overlap is created in the sequential detail images captured by the second system 120. In several embodiments the overview images have a lower resolution than the detail images, in order to produce a high redundancy within the overview images without creating unnecessary data storage and processing requirements.

As illustrated in FIG. 1, due to the physical arrangement of the imaging systems or cameras, detail image 122 has some overlap with detail image 124, and detail image 124 has some overlap with detail image 126 in the direction of detail axis 130. As will be understood by one of skill in the art, translation of first system 110 and second system 120 along the x-axis 115 with periodic capturing of images allows for a swath or strip of ground to be imaged in detail images 122, 124, and 126, with the overlap insuring that the detail images capture a contiguous strip corresponding to a swath of ground. Movement or translation of the first system 110 and second system 120 along with periodic capture of images results in the capture of contiguous strips/swaths having a first degree of forward overlap at the detail image level, and capture of overview images having a second degree of forward overlap, the second degree of overlap being higher than the first degree of overlap.

In alternate embodiments first system 110 and second system 120 are translated along y-axis 114. In yet another embodiment, first system 110 is translated separately from second system 120. In yet another embodiment overview image 112 and detail images 122, 124 and 126 are captured at separate times from first system 110 and second system 120 respectively.

Further, first and second systems 110, 120 may include arrays of digital image capturing devices, such as cascaded or adjacent groups of multiple cameras mounted in rigid or semi-rigid mounts. Persons of ordinary skill in the art will appreciate that such mounting details are exemplary. For instance, the term rigid or semi-rigid mounting system can describe any apparatus capable of accurately defining the relative position of an imaging system such as a single camera or a plurality of cameras. Such a mounting system can be constructed in a number of ways. For example, the mounting system may be comprised of a rigid structure, such as mounting the cameras into a pod enclosure; it may comprise cameras held in independent but accurate positions relative to one another, such as cameras mounted in multiple distinct aerial or satellite systems with a local referencing system to define relative camera positioning between the satellites. Alternatively, first system 110 may consist of a low-resolution imaging array, and second system 120 may consist of one or more high-resolution imaging arrays, with the arrangement and the imaging of the arrays selected such that the low-resolution imaging array of first system 110 captures overview image 112, and the high-resolution imaging arrays capture detail images 122, 124 and 126.

Figure 2A:
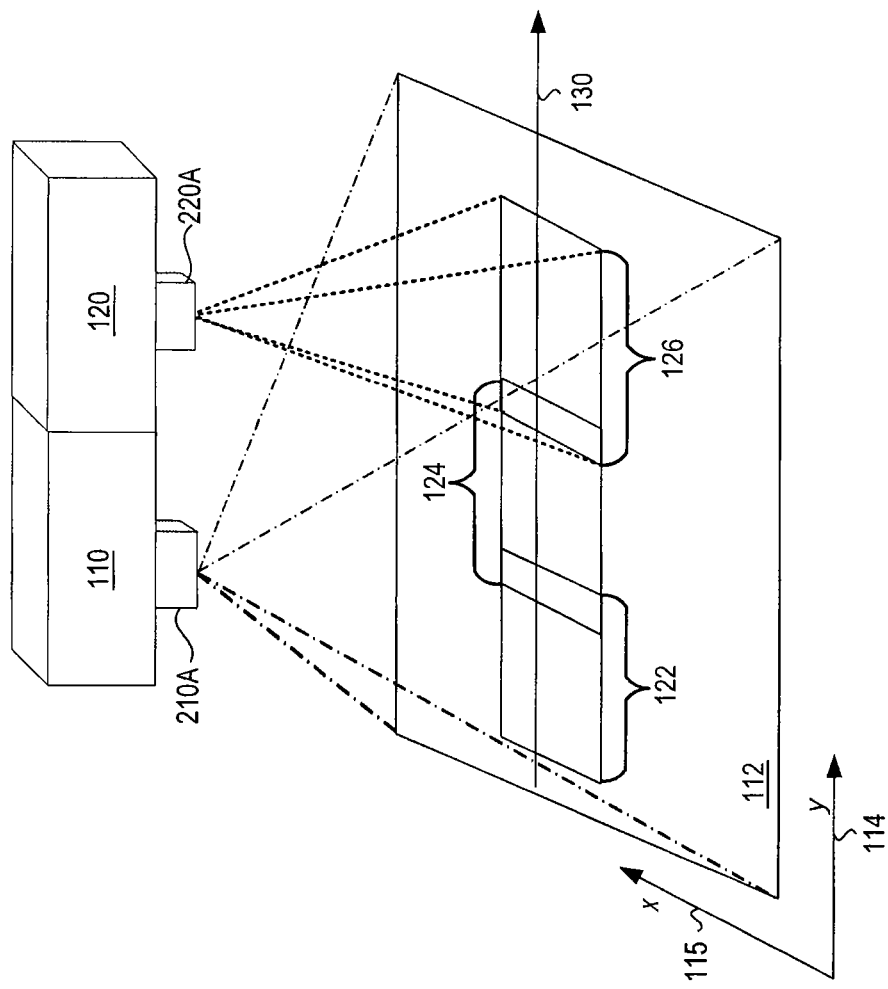
FIGS. 2A-2B are block diagrams of other exemplary systems for capturing overview and detail images.
Figure 2B:
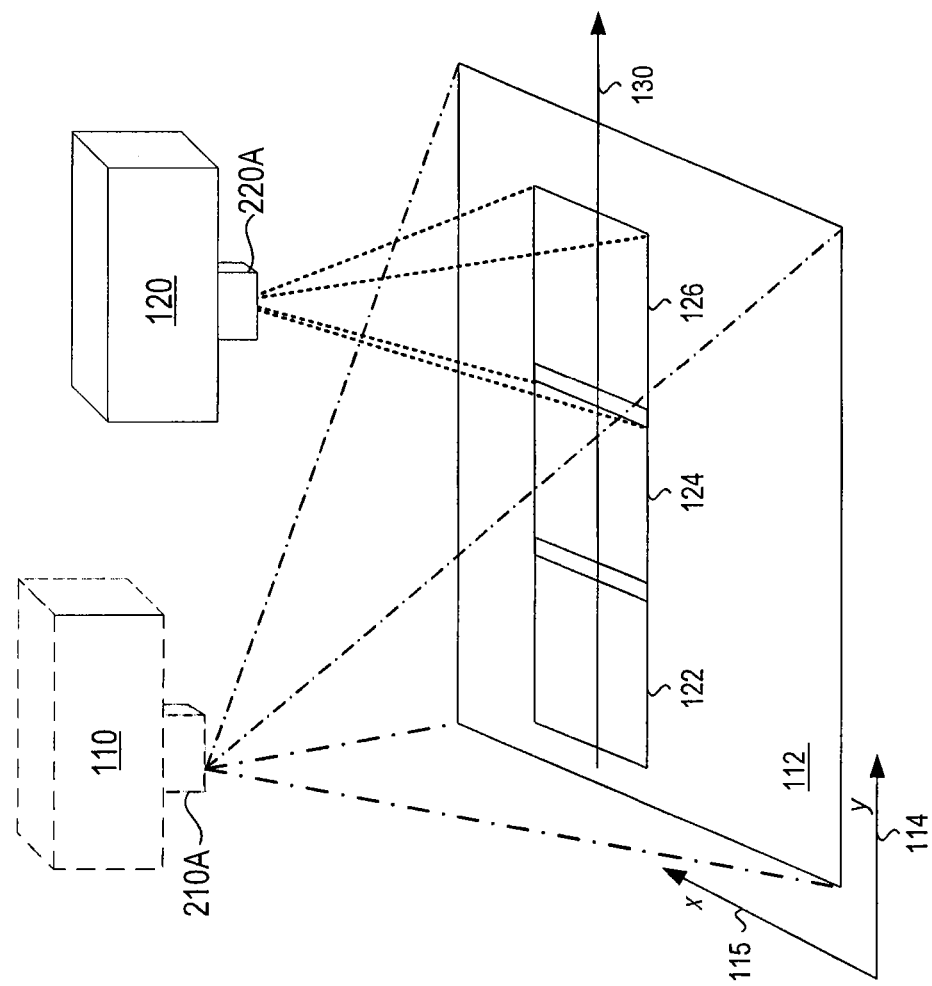

System 100 of FIG. 1 is also exemplary with regard to various configurations that may be present between or among systems 110, 120 and/or their image capturing devices. For example, FIGS. 2A-2B are block diagrams illustrating differing arrangements of the first system 110 and the second system 120 consistent with the methods and systems disclosed herein. In both FIGS. 2A and 2B imaging systems 210A and 220A are used with the first system 110 and second system 120 respectively. FIG. 2A illustrates an implementation wherein the first system 110 and the second system 120 are located in one fixed location, such as on an aerial platform, in or on an aircraft including without limitation a fixed wing aircraft or helicopter, in a satellite, high altitude or spaced based observation platform, or in or on an ocean going craft, such as a ship, submarine, or other undersea vessel. In this embodiment, first system 110 and second system 120 are located near each other and are moved together. In other applications the proximately located first system 110 and second system 120 are used for ground observations, earth-sky observations, undersea imaging, or microscopic imaging.

FIG. 2B illustrates an embodiment where first system 110 is positioned separately from second system 120. In this embodiment the first and second systems are kept independent but the locations of the two (or more) systems relative to one another are precisely known or calculated. In a physical structure this can be accomplished through rigid mounting such as in a pod enclosure. Alternatively, tracking of the relative position between first system 110 and second system 120 will allow for use of two completely independent platforms. In one embodiment a first aircraft or other type of vehicle may create overview images using first system 110, while a second aircraft or other type of vehicle may create detail images using second system 120. Navigational or inertial guidance systems can be utilized to determine the relative positioning of the systems. In yet another embodiment the systems are mounted in multiple distinct satellite systems with a local referencing system used to define relative camera positioning between satellites.

Figure 3:
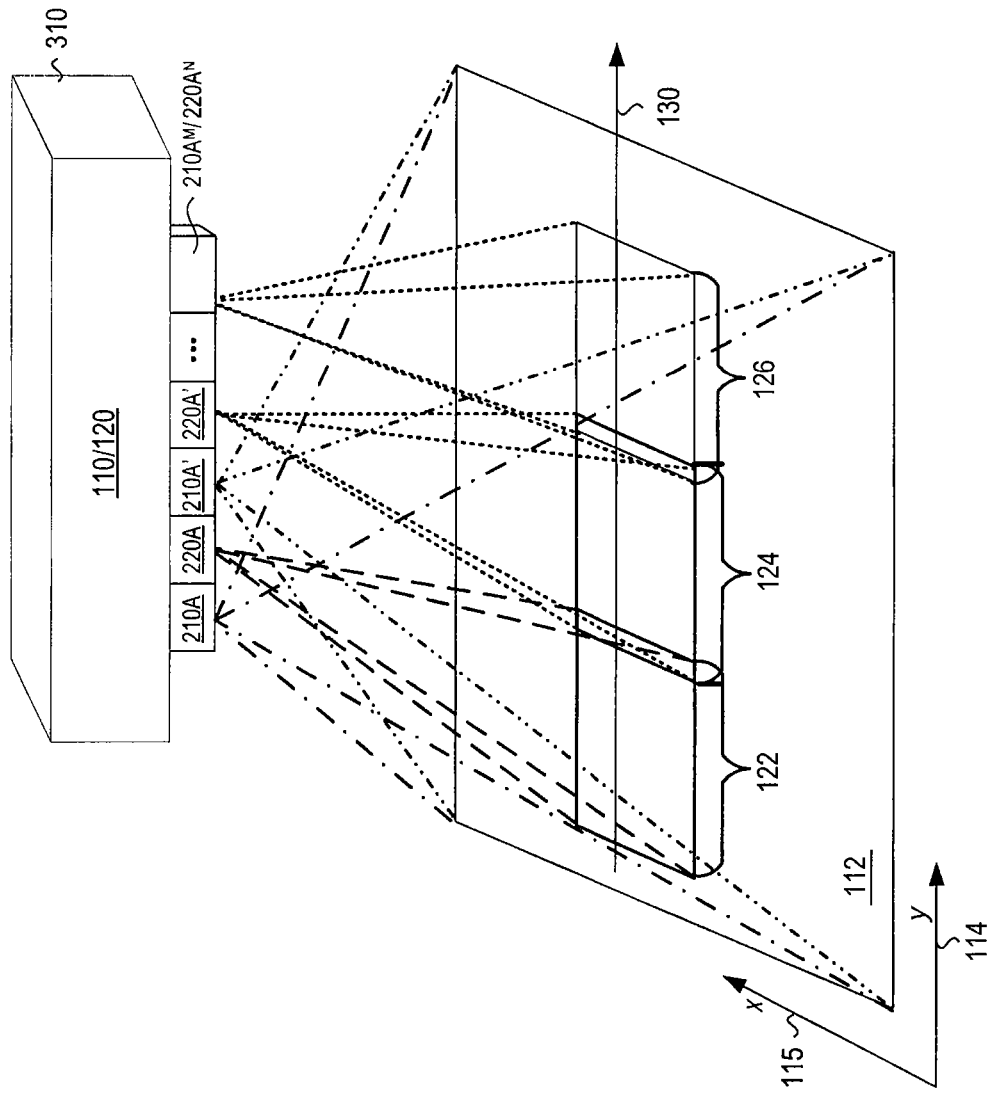
FIG. 3 is a block diagram of another exemplary system for capturing overview and detail images.

FIG. 3 is a block diagram of another exemplary system consistent with certain aspects related to the innovations herein. As shown in FIG. 3, a unitary platform or module 310 may include or embody both the first system 110 and the second system 120. The unitary platform can be any arrangement or configuration in which first system and second system are fixedly attached and can be translated or moved together. According to further implementations, the platform 310 may also include various arrangements and/or arrays of first and second image capturing devices or cameras. With respect to FIG. 3, image capturing systems 210A and 210A' represent first imaging systems which capture overview images at a first resolution. The number of image capturing systems which capture the overview images at a first resolution can be extended as illustrated by image capturing system $210A^M$, and as such a plurality of cameras or other imaging devices can be used to create the overview image 112. In one embodiment each of the first imaging systems 210A, 210A' through $210A^M$ is used to take the complete overview image 112, while in an alternate embodiment the first imaging systems 210A, 210', through $210A^M$ are arranged to take segments of overview image 112 and as such support the assembly of an entire overview image. In one embodiment the first imaging systems 210A, 210A', through $210A^M$ are arranged along detail axis 130. In alternate embodiments first imaging systems 210A, 210A', through $210A^M$ are arranged along x-axis 115, in an array format, or in any other arrangement which provides for coverage of the overview area to be captured in overview image 112. As previously discussed, the arrangements and/or arrays of imaging devices can be configured to create a cascade of imaging systems producing a spectra of resolutions with redundancy generally decreasing with increasing resolution.

Referring again to FIG. 3, detail images 122, 124, and 126, having a higher resolution than overview image 112, are captured with second imaging systems 220A, 220A', and $220A^N$ respectively. In one embodiment the detail images 122, 124, and 126 are overlapping detail images aligned along detail axis 130, detail axis 130 being substantially parallel to y-axis 114. In other embodiments second imaging systems 220A, 220A', and $220A^N$ are all arranged along x-axis 115, in an array format, or in any other overlapping or non-overlapping format which allows for the capture of detail images such as detail images 122, 124 and 126.

In one embodiment first imaging systems 210A, 210A', through $210A^M$ and second imaging systems 220A, 220A' and $220A^N$ are all based on the same type of imaging system, such as a digital camera operating in the visible portion of the spectrum. In an alternate embodiment, the individual imaging systems within first imaging systems 210A, 210A' through $210A^M$ and second imaging systems 220A, 220A', and $220A^N$ are different. For example, first imaging system 220A may operate in the visible region of the spectrum, while second imaging system 220A' can operate in the infrared portion of the spectrum. Similarly, second imaging systems 220A, 220A' and $220A^N$ may be of different types (e.g. visible and infrared) and can be organized such that detail image 122 is captured twice or more, once by each of two or more imaging systems. As will be understood by one of skill in the art, detail images 122, 124 and 126 can be captured by multiple types of imaging systems (e.g. visible or infrared), or with each detail image being captured by a single type of imaging system.

Figure 4:
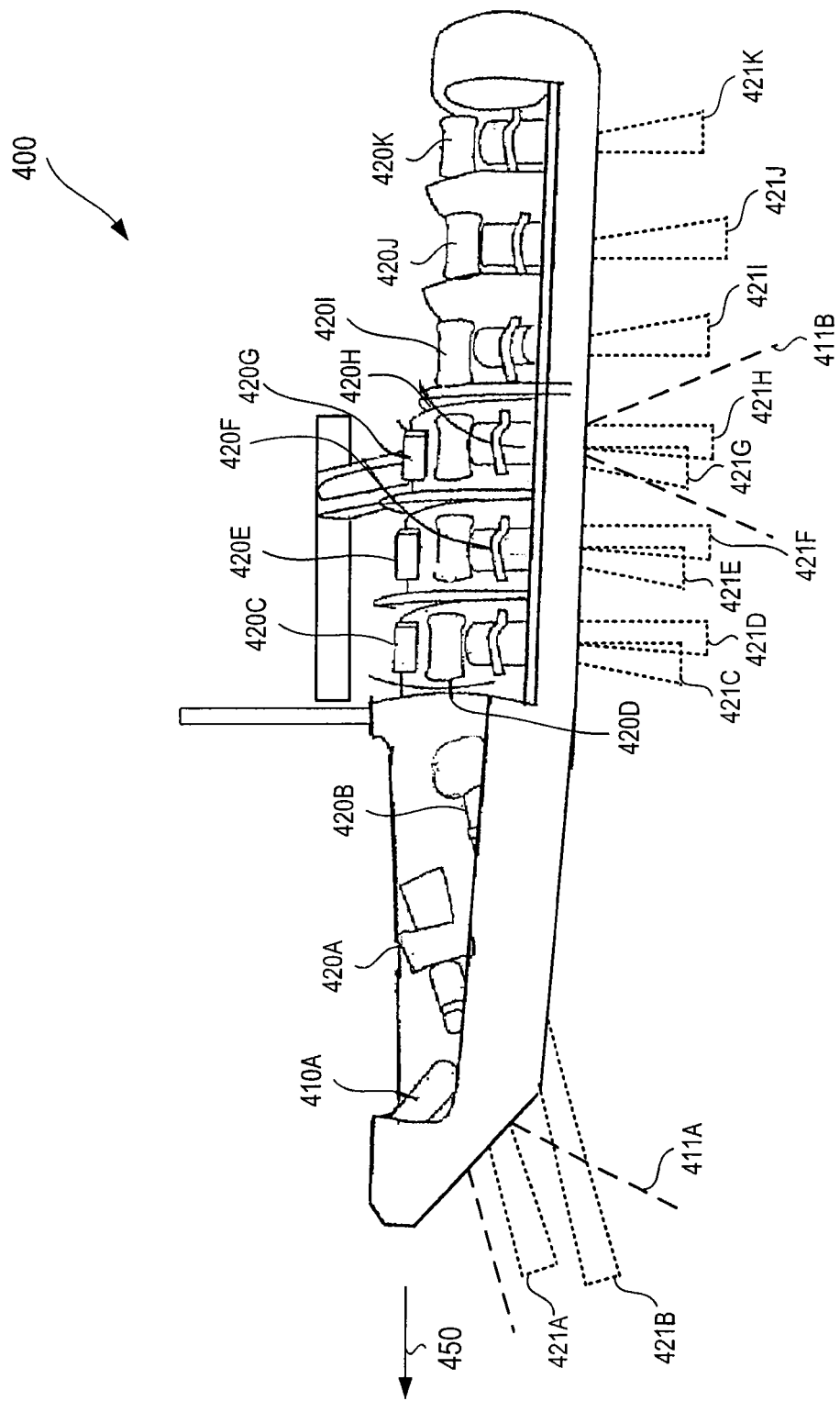
FIG. 4 is a representative diagram of a camera pod system.

Referring to FIG. 4, a unitary module 400 is disclosed, including a first overview camera 410A subtending a first overview camera view 411A, a second overview camera (not shown in FIG. 4) subtending a second overview camera view 411B, a first detail camera 420A subtending a first detail view 421A, a second detail camera 420B subtending a second detail camera view 421B, a third detail camera 420C subtending a third detail camera view 421C, a fourth detail camera 420D subtending a fourth detail camera view 421D, a fifth detail camera 420E subtending a fifth detail camera view 421E, a sixth detail camera 420F subtending a sixth detail camera view 421F, a seventh detail camera 420G subtending a seventh detail camera view 421G, an eighth detail camera 420H subtending an eight detail camera view 421H, a ninth detail camera 420I subtending a ninth detail camera view 421I, a tenth detail camera 420J subtending a tenth detail camera view 421J, and an eleventh detail camera 420K subtending an eleventh detail camera view 421K. Local data storage may be used with each camera, thus eliminating the need to write back to a central memory or storage location. The local data storage can be comprised of any type of digital memory including but not limited to flash or other type of nonvolatile memory, volatile memory and associated systems for retaining information in that memory, disk drives, or other types of digital storage media or systems. Alternatively, cameras may share local memory. With regard to the latter, some of the innovations herein include features of compressing and/or storing images in association with each camera, rather than requiring captured photos to be transmitted to and stored in a central storage system. Parallel compression and storage of photos with each camera increases the maximum throughput and storage for the camera system, which allows surveys to be flown at a faster rate, enabling more data to be stored and flight time to be increased. Such parallel compression and storage with each camera also increases storage reliability, as it allows use of compact flash or other solid-state media with each camera.

Existing digital imaging systems typically store the raw linear sensor as 12 to 16 bit data stored to a central storage system. In contrast, by performing compression on each camera in parallel, the data can be converted to a gamma color space such as YCbCr. This allows data to be stored as 8 bit data, since increased bit depth is typically only needed for raw linear data, and further allows compression of images prior to storage on each camera's data store. Conversion to a gamma color space and compression can enable about a 10-fold reduction in storage space requirements. For example, in a system having 14 cameras, each with its own 32 GB compact flash memory card, the total of 448 GB of storage can be equivalent to upwards of about 4,500 GB or 4.5 TB of storage of raw uncompressed photo data. Parallel operation eliminates the need to transmit image data or any other signals from the cameras to the flight control computer system, and as such increase the capture rate for the camera system, thus reducing post-processing requirements and increasing robustness by reducing cabling and signaling requirements.

A flight plan and image capture timing subsystem can be used to generate one or more capture signals to be sent to the cameras such as those illustrated in FIG. 4. In one embodiment, a single capture signal is sent from the flight plan and image capture timing subsystem to each camera. However, differences in cable lengths, delay times in the cameras, and other variables may result in the photos being taken at slightly different times. Furthermore, the local clocks of the cameras may be inexact or exhibit drift.

In one embodiment, digital cameras, typically containing CMOS imaging sensor arrays, are used to capture the overview and detail images. In an alternate embodiment, push broom sensors, comprised of a linear array of optical sensors, can be used to capture the detail images and serve as the detail image capture system. In another embodiment, a whisk broom or spotlight sensor can be used to generate the detail images. When using a whisk broom sensor a mirror-based or other type of scanning system creates the image by imaging a single spot onto the sensor. The scanning system can be integrated with the timing and navigational systems such that the scanning rate is appropriately synchronized with the forward motion of the vehicle carrying the camera systems and creates the appropriate resolution detail image.

One of ordinary skill in the art would recognize that the quantities (i.e., of both the cameras and of the arrays) of detail cameras may be adjusted to provide for image results desired. Advantages consistent with such implementations include the ability to configure and/or reconfigure module 400 to target different survey requirements, such as the collection of vertical or oblique (high or low) images, or combinations thereof. As understood by one of skill in the art, vertical images or photographs are those taken with the camera axis directed as nearly vertically as possible, whereas oblique images or photos refer to those images or photographs taken with the camera axis intentionally tilted away from the vertical. Also, one of skill in the art will understand that high oblique images or photographs generally include the horizon, whereas low oblique images or photographs generally do not include the horizon.

Referring to FIG. 4, the plurality of cameras can be arranged in unitary module 400 such that the cameras generally align along module axis 450. In one embodiment module axis 450 is substantially parallel to x-axis 115 of FIG. 3, which is typically in the direction of forward travel of the aircraft or other vehicle. In this embodiment detail axis 130 (not shown in FIG. 4) is substantially perpendicular to module axis 450 and the detail cameras are arranged to create an imaging swath which is substantially parallel to y-axis 114 of FIG. 3.

FIGS. 8A and 8B provide examples of the details of camera arrangements which may be used in one embodiment. The specific examples disclosed herein are not to be taken as limiting and do not in any way restrict the use of the methods and systems disclosed herein, which can be applied to many types and configurations of imaging systems. For example, although the exemplary arrangement details reference Canon or Nikon equipment, other types of imaging equipment or combinations thereof, or different combinations of camera groups, layouts, or lenses, may be utilized. In one embodiment the cameras are grouped such that the overview cameras (Canon or Nikon brand cameras) are comprised of a vertical overview camera in the form of a camera with a 28 mm lens pointing vertically down, as noted in Table I of FIG. 8A, and a rear overview camera with a 28 mm lens pointing aft (or opposite the direction of movement of the aircraft or other vehicle) at an angle of 35 degrees from the vertical. In this embodiment the Canon high resolution cameras are comprised of a vertical group of five cameras with 200 mm lenses and with a group spacing of −19°, −9.5°, 0°, 9.5°, 19°, and 28.5°; a side oblique group is comprised of three cameras having 200 mm lenses and a group spacing of 38°, 47.5°, 57°; and a rear oblique group comprised of three cameras with 135 mm lenses with a group spacing of −14.5°, 0°, 14.5° inclined 50° off vertical. In the case of Nikon high resolution cameras, a vertical group of 6 cameras having 180 mm lenses has a group spacing of −21°, −10.5°, 0°, 10.5°, 21°, 31.5°; a side oblique group of 3 cameras having 180 mm lenses having a group spacing of 42°, 52.5°, and 63°; and a rear oblique group of 3 cameras having 135 mm lenses with a group spacing of −14.5°, 0°, 14.5° inclined 50° off vertical.

In an alternate embodiment a first set of cameras is configured with wide-angle lenses and are used to capture photos with a very large amount of overlap such as 50/99 (50% side and 99% forward). Photos captured by these cameras cover a large area per photo, and the high degree of overlap and redundancy results in common features, common elements, common points, or image elements points being visible in many more photos than previous systems, thus enabling precise determination of interior and exterior orientation even without the use of a stabilized platform. A second set of cameras can be configured with longer focal length lenses and used to capture detail imagery to generate the detailed photomaps for the survey. A low amount of overlap is used in these cameras to minimize redundancy and to maximize use of the photo imagery for the detail survey, significantly reducing the overall costs and time required to complete the survey.

Figure 5A:
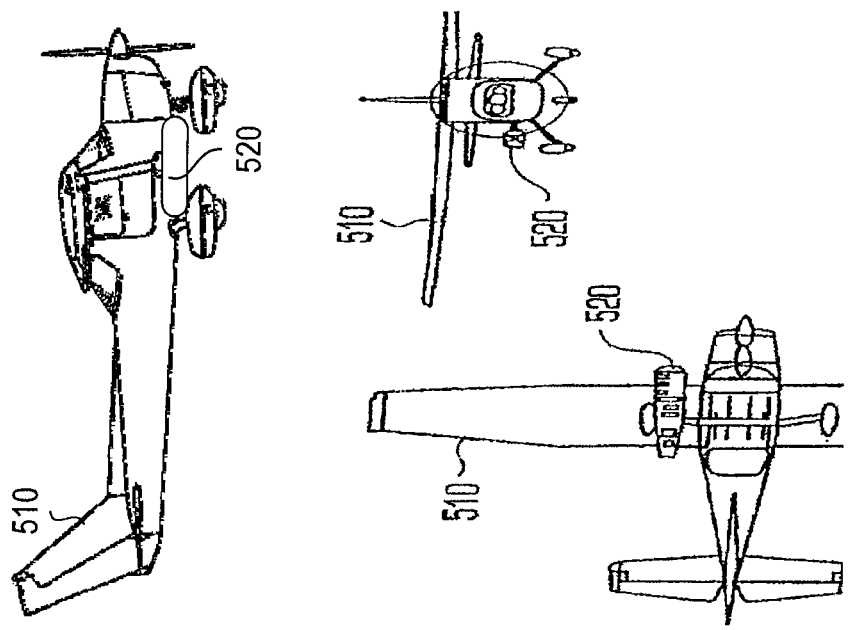
FIG. 5A illustrates one exemplary implementation including an external pod mounted on a small single engine aircraft.
Figure 5D:
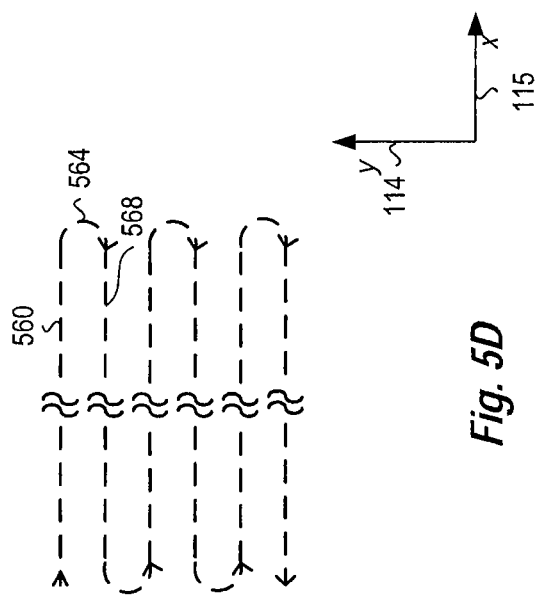
FIG. 5D illustrates an exemplary flight plan for the collection of overview and detail images.
Figure 5C:
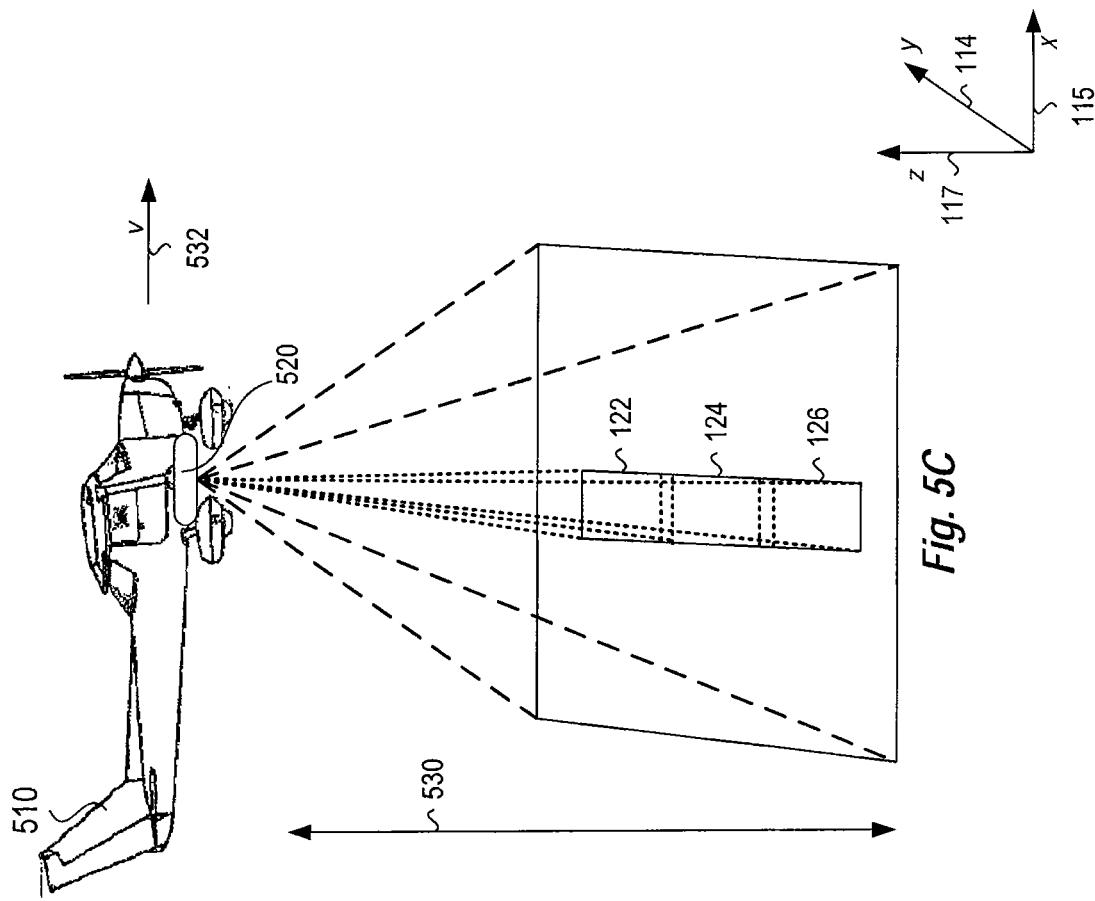
FIG. 5C illustrates exemplary utilization of an aircraft for data collection of overview and detail images.

FIG. 5A illustrates one exemplary implementation including an external pod mounted on a small single engine aircraft 510. Referring to FIG. 5A, in one embodiment of the invention the cameras for the camera system are mounted into a pod or removable housing 520, which serves as the unitary module 400. As such it is possible to use the camera system on a standard small aircraft 510, such as a Cessna 210, without requiring modifications to the airframe. FIG. 5B illustrates an exemplary implementation of an image capturing system. As shown in FIG. 5B, the pod or removable housing 520 may include a plurality of overview and detail cameras 410 and 420, which may be grouped or arranged as previously described and with respect to FIGS. 4, 8A and 8B. Implementations as shown in FIGS. 5A and 5B provide high accuracy without requiring a stabilized mounting platform, and also enable sufficient weight and size reduction allowing the camera system to be mounted in an Unmanned Aerial Vehicle (UAV).

Flight surveys can be performed at different altitudes and with different flight times, with different resulting resolutions. For example, and in correspondence with the camera configurations illustrated in FIGS. 8A and 8B, a flight survey performed with 1 vertical Canon 1 Ds MkIII camera with a 28 mm focal length lens and 5 vertical Canon 1 Ds MkIII cameras with 200 mm focal length lenses at an altitude of 8,000 ft. can generate data for a final photomap with a resolution of 7.5 cm. In this example, with a capture rate of 330 km²/hr, a typical city of 50 km×40 km can be captured in a flight time of 6 hours.

In another embodiment, in correspondence with the camera configurations illustrated in FIG. 8C, with 1 vertical overview Canon 1 Ds MkIII camera with a 28 mm focal length lens and 9 detail Canon 1 Ds MkIII cameras with 300 mm focal length lenses and at an altitude of 10,000 ft., a capture rate of 500 km²/hr can be obtained, resulting in a flight time of 4 hours to capture a typical city of 50 km×40 km with a resulting resolution of 6.5 cm.

Higher resolutions can be captured using the same embodiments discussed above, or in other embodiments by using longer flight times (e.g. 3.5 cm resolution captured in a flight survey of 9 hours) at lower altitudes. The aforementioned flight surveys are representative examples only and are not given to limit the scope of the invention, which may be practiced under a wide variety of conditions. For underwater applications, altitude can be understood to be comparable to the distance above the ocean floor.

As will be appreciated by one of skill in the art, various configurations of imaging systems can be used with differing relationships between altitude and resolution, all of those configurations being within the spirit and the scope of the invention. In one embodiment, 1 cm resolution is produced for every 1,000 ft. of altitude (e.g. 3 cm resolution at 3,000 ft. altitude, 7 cm resolution at 7,000 ft. altitude). In a second embodiment, the ground point resolution in cm is the altitude in ft. divided by 900. In a third embodiment, the ground point resolution in cm is the altitude in ft. divided by 800, and in a fourth embodiment the ground resolution in cm is the altitude in ft. divided by 2,000.

Referring to FIG. 5C, use of the method and system in one embodiment is illustrated in which aircraft 510 is equipped with the pod or removable housing 520 and travels at a given altitude h 530 (represented along z-axis 117), at a velocity v 532, the travel being generally performed in the x-y plane as defined by x-axis 115 and y-axis 114.

FIG. 5D is a flight plan for a survey in the x-y plane, that flight plan having a first long segment 560, followed by a turn 564, followed by return long segment 568. Repeated combinations of long segments, turns, and return long segments can be used to create the flight plan for the survey area.

The method and system described herein can also incorporate a flight plan and timing system/subsystem which generates a flight plan suitable for generating a photomap of a particular area, as well as for capturing signals indicating to the overview and detail image capture systems which respective images should be captured. In one embodiment, the flight plan contains parameters such as altitude, direction of travel, airspeed, waypoints and turnaround locations. As will be understood by one of skill in the art, the flight plan directs the pilot (or vehicle in the case of an unmanned or auto controlled craft) to fly in a pattern that allows the creation of images having the appropriate degree of sideways overlap. Although the overlap in the forward direction is controlled by the timing of the image capture signals, the overlap in the side direction is controlled primarily by the path of the aircraft/vehicle in relation to previous parallel paths in the flight.

In one embodiment the flight plan and timing system/subsystem receives input signals from navigational equipment including ground based (e.g. VOR, LORAN) and satellite systems (e.g. GPS and WAAS) to determine position. Signals generated from inertial systems can be used in conjunction with the location determining signals to determine changes in velocity as well as changes in pitch, yaw and roll of the aircraft. In one embodiment, rapid changes in direction can be determined using Micro-Electrical-Mechanical Systems (MEMS). Both short term and long term deviations from the proposed flight plan can be incorporated by the flight plan and image capture timing subsystem to indicate corrections to the flight plan or adjust the capture signals being sent to the overview and detail image capture systems.

In one embodiment the flight plan and image capture timing subsystem is based on a personal computer with additional navigational equipment (e.g. GPS, D-GPS), displays, and programming which enables a flight plan to be developed and generates timing signals for image capture consistent with the desired overlap. In an alternate embodiment specialized hardware is used for flight plan development and image capture signal generation.

FIGS. 6A-6B are diagrams illustrating exemplary overview and detail image representations. FIG. 6A shows one exemplary representation wherein multiple cameras are configured to maximize the amount of detail image data 610 obtained in the unique (non overlapped) area through the use of multiple detail cameras, while ensuring that sufficient overlap exists between overview images 612 to create the desired redundancy to enable successful processing into photomaps.

The representation of FIG. 6A may be achieved, for example, using one overview camera (see, e.g., representative images 612, 616, 620, 624 thereof) to capture interior and exterior orientation, and a one group of nine cameras arranged in an adjacent manner to capture a strip of detail photos 610, 614, 618, 622 or sub-portions of each overview photo in higher resolution than the overview resolution. As set forth above, aspects of the innovations herein may include fixed or partially adjustable alignment of cameras in the camera system, which allows photos to be taken with minimal overlap between the detail images forming the strip. Further, images may be taken often enough to ensure that overlap exists between sequential images taken along a flight line, and flight lines may be organized to ensure that there is overlap between strips of detail images taken along adjacent flight lines. Unlike existing systems where significant overlap is required to perform accurate bundle adjustment, present innovations enable use of a minimal amount of overlap to exist between subsequent, sequential or adjacent strips of detail images, which only need to be sufficient to later perform creation of a seamless photomap. As a result, the redundancy required for a strip of photos from detail cameras is much less than with existing systems, which significantly decreases survey time and costs.

Figure 7A:
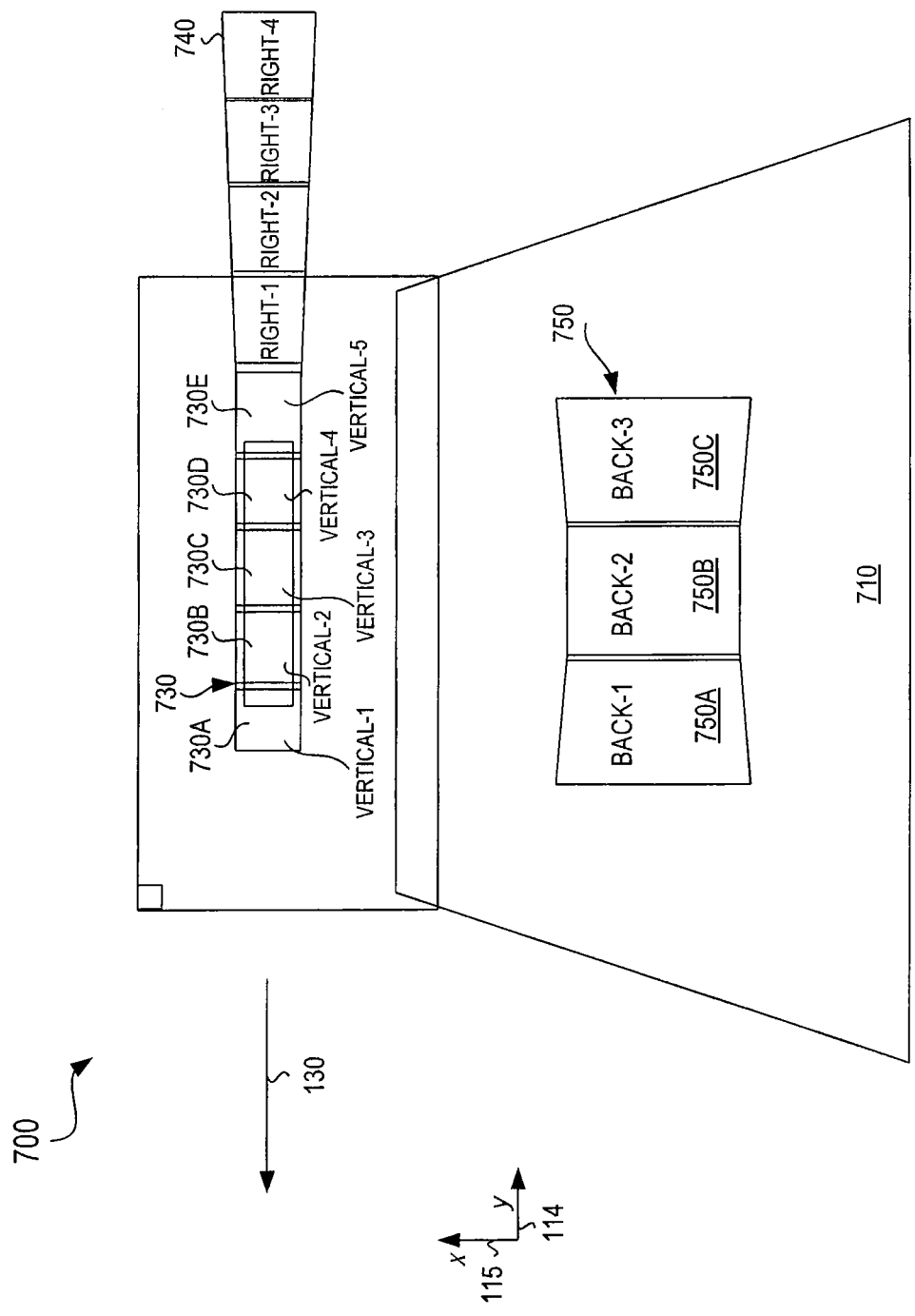
FIGS. 7A-7B are diagrams illustrating further exemplary overview and detail image representations.
Figure 7B:
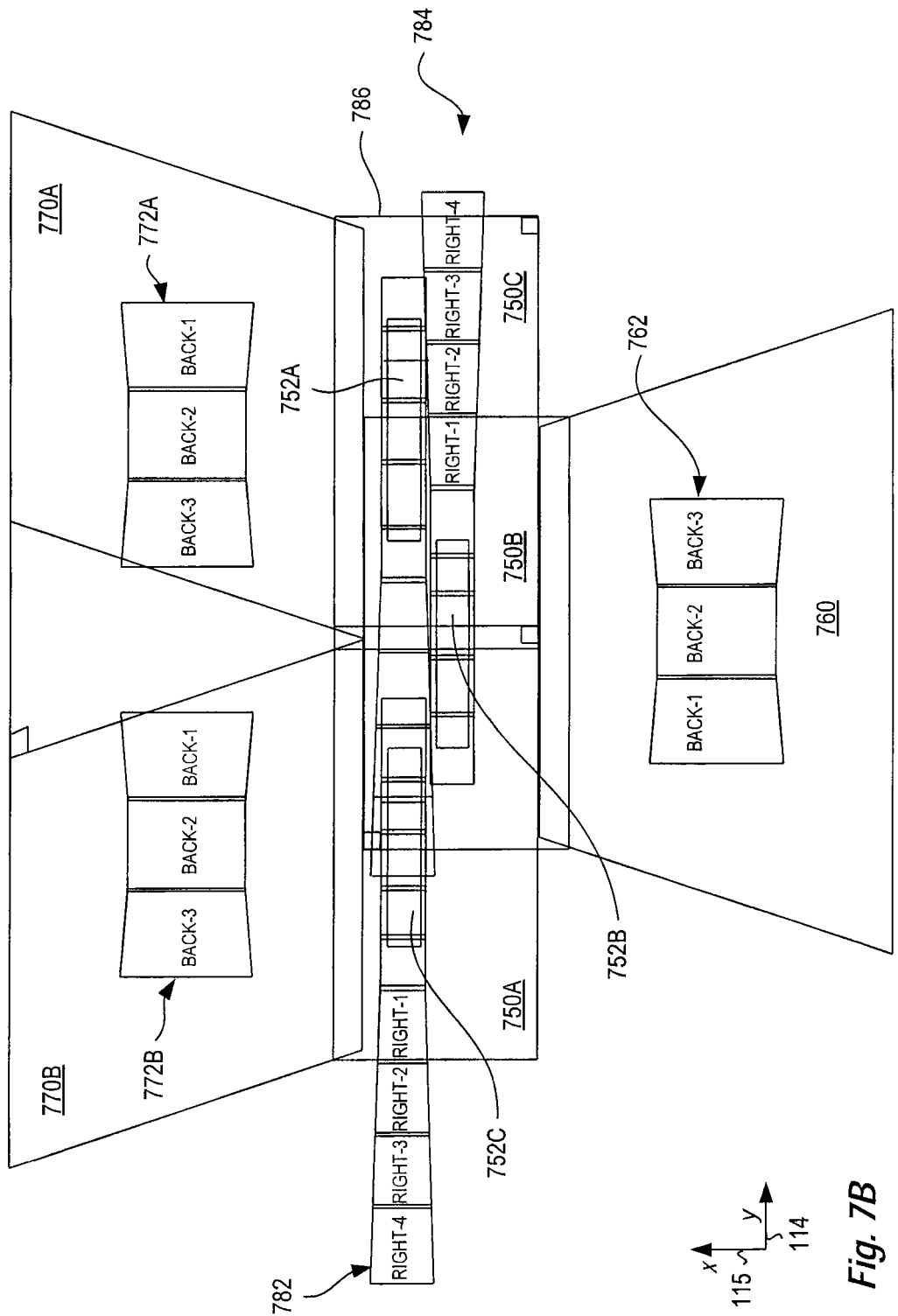

Moreover, as many additional detail cameras as required may be configured in a adjacent or cascaded fashion to capture detailed sub-portions of the overview images for specific views, such as nadir overhead (vertical) images or oblique images from different look angles. These images can be subsequently processed to produce the corresponding nadir overhead photomaps or oblique photomaps. Because a single detail camera may not have sufficient resolution to capture a sub-portion in sufficient resolution for the desired survey, a group of detail cameras for a specific view perspective may be organized in a strip to capture a wider swath of the desired perspective. FIGS. 7A-7B illustrate further exemplary overview and detail image representations. FIG. 7A illustrates the results of three adjacent groups of detail cameras in which five cameras produce images corresponding to the detailed vertical view (e.g., images 730, 730A-E), four cameras produce images corresponding to the detailed left and right oblique views from alternating flight lines (e.g., images 740), and three cameras produce images corresponding to detailed front and back oblique views from alternating flight lines (e.g., images 750, 750A-C). FIG. 7B illustrates image capture through movement of the vehicle or aircraft, wherein multiple oblique views are provided by flying flight lines in alternating directions, for example, by obtaining four oblique views from two groups of oblique cameras.

As previously discussed with respect to FIGS. 8A, 8B, and 8C, particular types of cameras can be geometrically arranged to achieve the imaging configurations illustrated in FIGS. 7A-7B. One of skill in the art will be able to determine alternate configurations to those disclosed herein suitable for capture of aerial data from various airborne vehicles or aircraft, or in the case of ocean floor mapping, from seagoing vessels.

Images collected using the present method and system have overlap with each other, resulting in the appearance of points common to two or more images or photographs. Such points may be referred to as common features, common elements, common points, or image elements, ground points, feature points, ground feature points, tie points, stereopairs or other terms referring to the repeated appearance of a point or object in a plurality of images. In some instances, the points may contain objects with known locations, those objects commonly referred to as control points. Common points can be used to develop an appropriate analytical stereomodel through the steps of interior orientation, relative orientation, and absolute orientation. Interior orientation generally recreates the geometry that existed in the camera (or other imaging system) when the image or photograph was taken. Analytical relative orientation is the process of determining the relative angular attitude and positional displacement between the photographs that existed when the photos were taken. The process of analytical absolute stereoorientation results in relating the coordinates of control points to their three-dimensional coordinates in a ground-based system.

Generally speaking, given a set of images depicting a number of points from different viewpoints, the traditional process of bundle adjustment can be used to adjust all photogrammetric measurements to ground control values (ground points or common points) in a single solution. Bundle adjustment can include determining the object space coordinates of all object points, and the exterior orientation parameters of all photographs. Bundle adjustment simultaneously refines estimates for ground point positions and for each photos exterior and interior orientation. A ground point position is identified as a feature in each photo. A requirement for bundle adjustment is to maximize the average and maximum number of photos in which a ground point can be identified. If a ground point is identified in too few photos, then the solution is not very rigid and suffers both from accuracy errors and from an increased risk of blunders, where incorrectly identified ground points have been used in the bundle solution. Bundle adjustment is capable of refining photos that have different poses, for example photos can have different oblique angles or can be vertically oriented. Further information regarding bundle adjustment is known to those of skill in the art and found in references such as "Elements of Photogrammetry with Applications in GIS, 3rd edition," by Paul Wolf and Bon Dewitt (McGraw Hill, 2000), U.S. Pat. No. 6,996,254" to Zhang, et. al, and "Bundle adjustment—a modern synthesis" by Bill Triggs, Philip McLauchlan, Richard Hartley and Andrew Fitzgibbon, appearing in Lecture Notes in Computer Science, vol. 1882 (Springer Verlag, January 2000), all of which are incorporated herein by reference.

Figure 9:
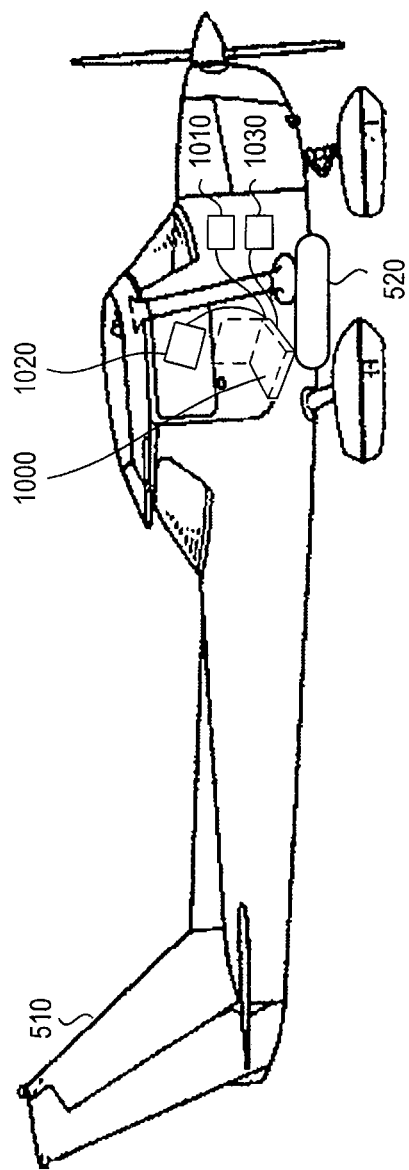
FIG. 9 illustrates an aircraft outfitted with a computing/processing system, a navigation/flight plan system, a flight plan display, and a camera pod system.

In one embodiment an imaging capturing system is mounted in or on an aircraft to take the appropriate raw images using the methods and systems described herein and to guide the pilot of the aircraft to the correct coordinates. FIG. 9 illustrates an exemplary aircraft outfitted with the necessary equipment in accordance with this embodiment. Aircraft 510 is prepared with the pod or removable housing 520 which is rigidly mounted to aircraft 510. In one embodiment the mounting is performed through removal of the passenger side aircraft door, and replacement of the door with a door/pod mount.

The pod or removable housing 520 contains a plurality of cameras as described above with respect to FIG. 4. In one embodiment, a series of movable doors cover the cameras in pod or removable housing 520 to protect the cameras during portions of the flight including takeoff and landing. In one embodiment sensors are incorporated into the camera doors, such that the status of the door can be monitored. In one embodiment cameras and doors of the pod or removable housing 520 are connected to a computer 1000. In this embodiment, computer 1000 runs software developed to control and operate elements of the system during flight. Although pictured as a laptop, the computer 1000 may be any computer including a laptop, ruggedized personal computer, a system embedded into the aircraft, a specialized computer, a portable device such as a Personal Digital Assistant or a cellular telephone.

Referring again to FIG. 9, computer 1000 is connected to a Global Positioning System (GPS) unit 1010, which produces a feed to track the plane's current position and log the current position in storage on the computer 1000. The camera control unit 1030 controls the camera array in the pod or removable housing 520, including sending signals to autofocus and take photographs. In the embodiment illustrated in FIG. 10, GPS unit 1010 serves as a navigation system/subsystem, while computer 1000 serves as a timing system/subsystem. In an alternate embodiment, computer 1000 incorporates the functionality of the navigation system and can include GPS unit 1010. In yet another embodiment, a dedicated unit has subsystems providing the navigation and timing functions.

Flight display 1020 is connected to computer 1000 and in one embodiment displays details of the flight. In an alternate embodiment, flight display 1020 shows the status of the system as a whole including status of the doors and activity of the cameras in acquiring images. The flight display 1020 may be the monitor from the personal computer 1000, an additional external monitor or a monitor embedded into the aircraft. The flight display 1020 may be a touch sensitive monitor and allow for the input of commands into the system. Alternatively, a mouse, keyboard or other input device (not shown) may be used to receive user input.

In one embodiment, the system displays a variety of information to the pilot of aircraft 510. This information may be displayed on the flight display 1020, the display of computer 1000 or in another display available to the pilot. The system displays flight lines of a projected area, defined geographic areas and survey data which define the actual area within the map to capture.

Figure 10:
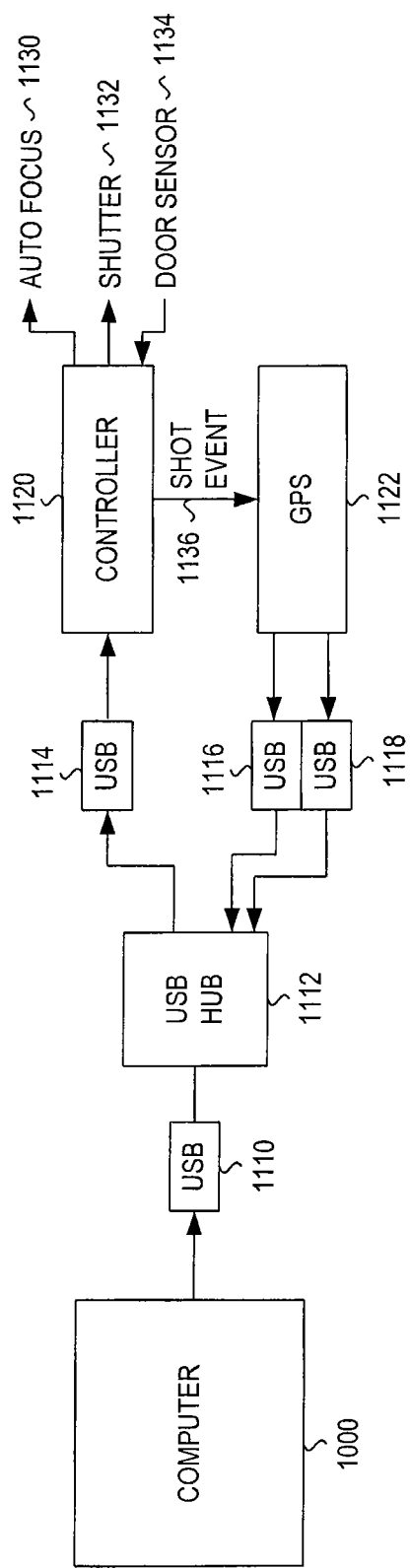
FIG. 10 illustrates a block diagram for a notebook/laptop computer working in conjunction with a controller and GPS system as described in one embodiment.

FIG. 10 illustrates a block diagram for computer 1000 working in conjunction with a controller 1120 and a GPS device 1122. In one embodiment computer 1000 includes at least one Universal Serial Bus (USB) port 1100 which is connected to a USB hub 1112. USB hub 1112 has a plurality of additional USB ports which allow for devices to be connected to and communicate with the computer 1100. The USB port 114 is connected to a controller 1120. As will be understood by one of skill in the art, other types of buses, wired or wireless, serial or parallel, can be used to interconnect the components of FIG. 10. In one embodiment controller 1120 is a camera control unit (e.g. camera control unit 1030) and controls the camera[s] in the pod or removable housing 520, enacting auto focus command 1130 and shutter command 1132 in the camera[s]. The controller 1120 also reads from a door sensor 1134 to determine if the doors protecting the cameras in the pod or removable housing 520 are open or closed. The door may be opened or closed as appropriate in response to the controller 1120 reading the door sensor 1134. The GPS device 1122 is connected to the USB hub 1112 through USB ports 1116, 1118. The GPS device 1122 reads the current geographic location of the device and transmits this data to the computer 1000. The controller 1120 is enabled to send a signal causing a photograph to be taken from removable housing 520.

The embodiments of the present disclosure may be implemented with any combination of hardware and software. If implemented as a computer-implemented apparatus, the present disclosure is implemented using means for performing all of the steps and functions described above.

The embodiments of the present disclosure can be included in an article of manufacture (e.g., one or more computer program products) having, for instance, computer useable or computer readable media. The media has embodied therein, for instance, computer readable program code means, including computer-executable instructions, for providing and facilitating the mechanisms of the embodiments of the present disclosure. The article of manufacture can be included as part of a computer system or sold separately.

While specific embodiments have been described in detail in the foregoing detailed description and illustrated in the accompanying drawings, it will be appreciated by those skilled in the art that various modifications and alternatives to those details could be developed in light of the overall teachings of the disclosure and the broad inventive concepts thereof. It is understood, therefore, that the scope of the present disclosure is not limited to the particular examples and implementations disclosed herein, but is intended to cover modifications within the spirit and scope thereof as defined by the appended claims and any and all equivalents thereof.

The invention claimed is:

1. A method of creating a seamless photomap of a survey area, the method comprising:
    (a) moving a vehicle relative to the survey area along a set of substantially parallel survey paths;
    (b) capturing, during vehicle movement and via an overview imaging system carried by the vehicle, a sequence of overview images, each overview image depicting an overview area of the survey area, consecutive overview areas along each survey path having a first degree of forward overlap, adjacent overview areas associated with adjacent survey paths having side overlap;
    (c) capturing, during vehicle movement and via a first detail imaging system carried by the vehicle, a sequence of detail image strips, each detail image strip comprising at least one detail image, each detail image depicting at least a portion of an overview area, each detail image having a higher resolution than a resolution of the overview image corresponding to the overview area, consecutive detail image strips along each survey path having a second degree of forward overlap, the second degree of overlap being smaller than the first degree of overlap, adjacent detail image strips associated with adjacent survey paths having side overlap, adjacent detail images within each strip having side overlap;
    (d) identifying, in a plurality of the overview images and detail images, common features corresponding to common ground points;
    (e) estimating, via bundle adjustment and using locations of the identified ground points in the plurality of overview images and detail images, an exterior orientation associated with each detail image; and
    (f) merging, using at least some of the estimated exterior orientations, the detail images to create the seamless photomap.

2. The method of claim 1, wherein the first detail imaging system views vertically, and the seamless photomap contains a substantially vertical view.

3. The method of claim 2 further comprising:
    capturing, via a second detail imaging system, a sequence of oblique detail image strips, and creating, from the oblique detail image strips, an oblique photomap of the survey area.

4. The method of claim 1, wherein the vehicle is one of a spacecraft, an airborne vehicle, an aircraft, a balloon, an unmanned aerial vehicle (UAV), a seagoing vessel, and a submarine.

5. The method of claim 1, wherein at least one of the imaging systems comprises at least one sensor, the at least one sensor being one of a digital image sensor, a push broom sensor, and a whisk broom sensor.

6. The method of claim 1, wherein at least one of the imaging systems comprises at least one sensor, the at least one sensor being one of an electromagnetic imager, a visible electromagnetic imager, an infrared electromagnetic imager, a thermographic imager, and an ultrasound imager.

7. A system for creating a seamless photomap of a survey area, the system comprising:
    (a) a vehicle configured to move relative to the survey area along a set of substantially parallel survey paths;
    (b) an overview imaging system disposed on the vehicle and configured to capture, during vehicle movement, a sequence of overview images, each overview image depicting an overview area of the survey area, consecutive overview areas along each survey path having a first degree of forward overlap, adjacent overview areas associated with adjacent survey paths having side overlap;
    (c) a first detail imaging system disposed on the vehicle and configured to capture, during the vehicle movement, a sequence of detail image strips, each detail image strip including at least one detail image, each detail image depicting at least a portion of an overview area, each detail image having a higher resolution than a resolution of the overview image corresponding to the overview area, consecutive detail image strips along each survey path having a second degree of forward overlap, the second degree of overlap being smaller than the first degree of overlap, adjacent detail image strips associated with adjacent survey paths having side overlap, adjacent detail images within each strip having side overlap; and
    (d) a computer system configured to:
        identify, in a plurality of the overview images and detail images, common features corresponding to common ground points,
        estimate, via bundle adjustment and using locations of the identified ground points in the plurality of overview images and detail images, an exterior orientation associated with each detail image, and
        merging, using at least some of the estimated exterior orientations, the detail images to create the seamless photomap.

8. The system of claim 7, wherein the first detail imaging system views vertically, and the seamless photomap contains a substantially vertical view.

9. The system of claim 8, further comprising:
    a second detail imaging system configured to capture a sequence of oblique detail image strips, wherein the computer system is further configured to create, from the oblique detail image strips, an oblique photomap of the survey area.

10. The system of claim 7, further comprising:
    an enclosure within which the imaging systems are mounted.

11. The system of claim 10, wherein each imaging system is removably mounted within the enclosure.

12. The system of claim 10, wherein the enclosure is configured to be mounted to the exterior of the vehicle.

13. The system of claim 10, wherein the enclosure is configured to be removably mounted to the exterior of the vehicle.

14. The system of claim 7, wherein each of the imaging systems comprises at least one imaging device.

15. The system of claim 14, further comprising:
a plurality of data storage devices, each data storage device associated with a respective one of the imaging devices and configured to store images captured by the imaging device.

16. The system of claim 15, wherein each data storage device is a flash memory data storage device.

17. The system of claim 14, wherein at least one of the imaging devices comprises at least one sensor, the at least one sensor being one of a digital image sensor, a push broom sensor, and a whisk broom sensor.

18. The system of claim 7, wherein the vehicle is one of a spacecraft, an airborne vehicle, an aircraft, a balloon, an unmanned aerial vehicle (UAV), a seagoing vessel, and a submarine.

19. The system of claim 14, wherein at least one of the imaging devices comprises at least one sensor, the at least one sensor being one of an electromagnetic imager, a visible electromagnetic imager, an infrared electromagnetic imager, a thermographic imager, and an ultrasound imager.

* * * * *